United States Patent
Giamei et al.

(10) Patent No.: US 11,221,850 B2
(45) Date of Patent: *Jan. 11, 2022

(54) SORT AND MERGE INSTRUCTION FOR A GENERAL-PURPOSE PROCESSOR

(71) Applicant: INTERNATIONAL BUSINESS MACHINES CORPORATION, Armonk, NY (US)

(72) Inventors: Bruce C. Giamei, Lagrangeville, NY (US); Martin Recktenwald, Schoenaich (DE); Donald W. Schmidt, Stone Ridge, NY (US); Timothy Siegel, Staatsburg, NY (US); Aditya N. Puranik, Pune (IN); Mark S. Farrell, Pleasant Valley, NY (US); Christian Jacobi, West Park, NY (US); Jonathan D. Bradbury, Poughkeepsie, NY (US); Christian Zoellin, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/037,962

(22) Filed: Sep. 30, 2020

(65) Prior Publication Data

US 2021/0011719 A1    Jan. 14, 2021

Related U.S. Application Data

(63) Continuation of application No. 16/181,923, filed on Nov. 6, 2018, now Pat. No. 10,831,478.

(51) Int. Cl.
*G06F 12/02* (2006.01)
*G06F 9/30* (2018.01)

(52) U.S. Cl.
CPC ........ *G06F 9/30032* (2013.01); *G06F 9/3009* (2013.01); *G06F 9/30123* (2013.01)

(58) Field of Classification Search
CPC . G06F 9/30032; G06F 9/3009; G06F 9/30123
See application file for complete search history.

(56) References Cited

U.S. PATENT DOCUMENTS

| 4,779,192 A | 10/1988 | Torii et al. |
| 4,890,220 A | 12/1989 | Nakagawa et al. |
| (Continued) | | |

FOREIGN PATENT DOCUMENTS

| EP | 0516266 A2 | 12/1992 |
| EP | 1217540 A1 | 6/2002 |
| (Continued) | | |

OTHER PUBLICATIONS

Giamei, Bruce C. et al., "Saving and Restoring Machine State Between Multiple Executions of an Instruction," U.S. Appl. No. 17/122,084, filed Dec. 15, 2020, pp. 1-95.

(Continued)

*Primary Examiner* — Cheng Yuan Tseng
(74) *Attorney, Agent, or Firm* — Steven Chiu, Esq.; Blanche E. Schiller, Esq.; Heslin Rothenberg Farley & Mesiti P.C.

(57) ABSTRACT

A Sort Lists instruction is provided to perform a sort and/or a merge operation. The instruction is an architected machine instruction of an instruction set architecture and is executed by a general-purpose processor of the computing environment. The executing includes sorting a plurality of input lists to obtain one or more sorted output lists, which are output.

20 Claims, 19 Drawing Sheets

(56) References Cited

U.S. PATENT DOCUMENTS

| | | |
|---|---|---|
| 5,210,870 A | 5/1993 | Baum et al. |
| 5,274,777 A | 12/1993 | Kawata |
| 5,475,882 A | 12/1995 | Sibigtroth |
| 5,517,611 A | 5/1996 | Deering |
| 5,796,997 A | 8/1998 | Lesartre |
| 5,799,167 A | 8/1998 | Lesartre |
| 5,909,544 A | 6/1999 | Kawata |
| 5,941,983 A | 8/1999 | Gupta |
| 6,308,254 B1 | 10/2001 | Sollars |
| 6,460,121 B1 | 10/2002 | Bonola |
| 6,523,030 B1 | 2/2003 | Horowitz |
| 6,795,966 B1 | 9/2004 | Lim et al. |
| 6,820,153 B2 | 11/2004 | Yangi |
| 7,080,159 B2 | 7/2006 | Chu et al. |
| 7,107,320 B2 | 9/2006 | Busser |
| 7,464,254 B2 | 12/2008 | Sharangpani |
| 7,500,089 B2 | 3/2009 | Iwanaga |
| 7,502,888 B2 | 3/2009 | Fowles |
| 7,561,571 B1 | 7/2009 | Lovett |
| 7,778,990 B2 | 8/2010 | Ito |
| 7,933,405 B2 | 4/2011 | Knowles |
| 7,945,789 B2 | 5/2011 | Nutter et al. |
| 7,987,158 B2 | 7/2011 | Boyd et al. |
| 8,230,410 B2 | 7/2012 | Loen |
| 8,266,112 B1 | 9/2012 | Beatty et al. |
| 8,695,010 B2 | 4/2014 | Frazier et al. |
| 8,850,423 B2 | 9/2014 | Barkie et al. |
| 8,935,512 B2 | 1/2015 | Kumura |
| 9,015,083 B1 | 4/2015 | Monga et al. |
| 9,405,538 B2 | 8/2016 | Ioffe |
| 9,513,916 B2 | 12/2016 | Gschwind et al. |
| 9,600,442 B2 | 3/2017 | Hughes |
| 9,665,626 B1 | 5/2017 | Foster |
| 9,710,874 B2 | 7/2017 | Palmer et al. |
| 9,727,594 B2 | 8/2017 | Larson et al. |
| 9,766,888 B2 * | 9/2017 | Gueron ............... G06F 9/30032 |
| 9,990,198 B2 | 6/2018 | Abdallah |
| 9,990,206 B2 | 6/2018 | Wang et al. |
| 9,990,314 B2 | 6/2018 | Rozas et al. |
| 10,089,075 B2 * | 10/2018 | Chhugani ............ G06F 9/3867 |
| 10,162,859 B2 | 12/2018 | Barsness |
| 10,203,958 B2 | 2/2019 | Zbiciak |
| 10,261,790 B2 | 4/2019 | Mishaeli |
| 10,496,371 B2 | 12/2019 | Li |
| 10,514,927 B2 | 12/2019 | Lechanka |
| 10,698,792 B2 | 6/2020 | Nelson |
| 2005/0283588 A1 | 12/2005 | Yamishita |
| 2006/0005097 A1 | 1/2006 | Ichikawa |
| 2006/0136923 A1 | 6/2006 | Kahn |
| 2008/0301408 A1 | 12/2008 | Kranich |
| 2012/0054731 A1 | 3/2012 | Aravamundan et al. |
| 2014/0089646 A1 | 3/2014 | Diewald |
| 2015/0178243 A1 | 6/2015 | Lowery et al. |
| 2015/0370558 A1 | 12/2015 | Gschwind et al. |
| 2016/0139934 A1 | 5/2016 | Sarangi et al. |
| 2016/0162293 A1 | 6/2016 | Hooker et al. |
| 2016/0224349 A1 | 8/2016 | Ge et al. |
| 2017/0109385 A1 | 4/2017 | Aronovich et al. |
| 2017/0109921 A1 | 4/2017 | Hasselgren et al. |
| 2017/0185415 A1 | 6/2017 | Mishra et al. |
| 2017/0212727 A1 | 7/2017 | Chhugani et al. |
| 2017/0308381 A1 | 10/2017 | Zbiciak |
| 2017/0371977 A1 | 12/2017 | Connolly et al. |
| 2018/0004520 A1 | 1/2018 | Gueron et al. |
| 2018/0011768 A1 | 1/2018 | Bradbury et al. |
| 2018/0107417 A1 | 4/2018 | Shechter |
| 2018/0113797 A1 | 4/2018 | Breslow et al. |
| 2020/0142669 A1 | 5/2020 | Giamei et al. |
| 2020/0142696 A1 | 5/2020 | Giamei et al. |
| 2020/0142705 A1 | 5/2020 | Giamei et al. |
| 2020/0142706 A1 | 5/2020 | Giamei et al. |
| 2020/0348940 A1 | 11/2020 | Giamei et al. |

FOREIGN PATENT DOCUMENTS

| | | |
|---|---|---|
| EP | 3118738 A1 | 1/2017 |
| TW | 201804322 A | 2/2018 |

OTHER PUBLICATIONS

List of IBM Patents or Patent Applications Treated as Related, Mar. 4, 2020, pp. 1-2.

Anonymous, "Dynamic Sorting Method with Combined Criteria In a Smart and Efficient Manner," IPCOM000227818D, May 2013, pp. 1-8 (+ cover).

Anonymous, "Hot-Patching a VM/guest Snapshot," IPCOM000244666D, Jan. 2016, pp. 1-2 (+ cover).

Anonymous, "Stable Bitonic Storing," IPCOM000213459D, Dec. 2011, pp. 1-6 (+ cover).

Arnold et al., "An Application-Specific Instruction Set For Accelerating Set-Oriented Database Primitives," SIGMOD'14 ACM International Conference on Management of Data, Jun. 2014, pp. 767-778.

Cabri, Giacomo et al., "Enabling Java Mobile Computing on the IBM Jikes Research Virtual Machine," Aug. 2006, pp. 62-71.

Fouts, Martin et al., "Brevix Design 1.01,"Apr. 1993, pp. 1-87.

Fukai, Takaaki, et al., "OS-Independent Live Migration Scheme for Bare-metal Clouds," Dec. 2015, pp. 80-89.

He et al., "Realtional Joins on Graphics Processors," SIGMOD'08 ACM SIGMOD International Conference on Management of Data, Jun. 2008, pp. 511-524.

Hollingsworth, Jeffrey et al., "MDL: A Language and Compiler for Dynamic Program Instrumentation," May 1997, pp. 1-21.

IBM, "Metadata Driven Mechanism for Recovery in Complex Script Based Process Failure," IPCOM00019094D, Nov. 2009, pp. 1-3 (+ cover).

IBM, "Methodology Improvements Lost Interrupt State Handling Software Recovery for Instruction Tracing," IPCOM000010547D, Dec. 2002, p. 1 (+ cover).

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Moore, James J. et al., "A Resiliency Model For High Performance Infrastructure Based on Logical Encapsulation," Jun. 2012, pp. 283-294.

Pelley, Steven, "Database and System Design for Emerging Storage Technologies," 2014 (no further date information available), pp. 1-160.

Sintorn et al., "Fast Parallel GPU-Sorting Using A Hybrid Algorithm," Journal of Parallel and Distributed Computing, vol. 68, Issue 10, Oct. 2018, pp. 1381-1388.

Wu et al., "Kernel Weaver: Automatically Fusing Database Primitives For Efficient GPU Computation", 45th Annual IEEE ACM International Symposium on Microarchitecture, Dec. 2012, pp. 107-118.

Zurich, Eth, "Work Sharing Data Processing Systems," 2014 (no further date information available), pp. 1-228.

Giamei, Bruce C. et al., "Saving and Restoring Machine State Between Multiple Executions of an Instruction," U.S. Appl. No. 16/933,037, filed Jul. 20, 2020, pp. 1-95.

List of IBM Patents or Patent Applications Treated as Related, Sep. 30, 2020, pp. 1-2.

Examination Report No. 1 For Standard Patent Application, IP Australia Application No. 2019376835, dated Nov. 16, 2021, pp. 1-3.

Examination Report No. 1 For Standard Patent Application, IP Australia Application No. 2019377216 dated Nov. 23, 2021, pp. 1-3.

\* cited by examiner

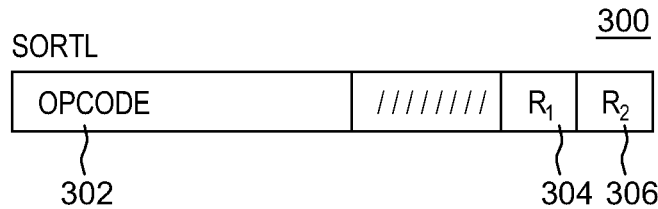
FIG. 3A
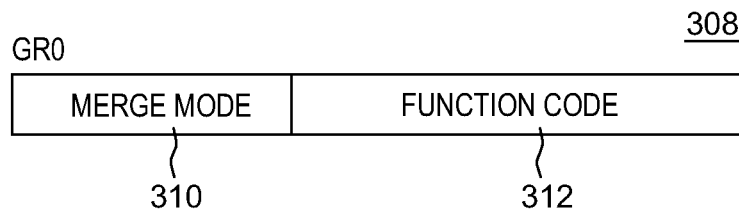
FIG. 3B
| | CODE | FUNCTION | PARAMETER BLOCK SIZE (BYTES) |
|---|---|---|---|
| 313 | 0 | SORTL - QAF | 32 |
| 315 | 1 | SORTL - SFLR | $576 + 16 \times N_{IS}$ |
| 317 | 2 | SORTL - SVLR | $576 + 16 \times N_{IS}$ |
FIG. 3C
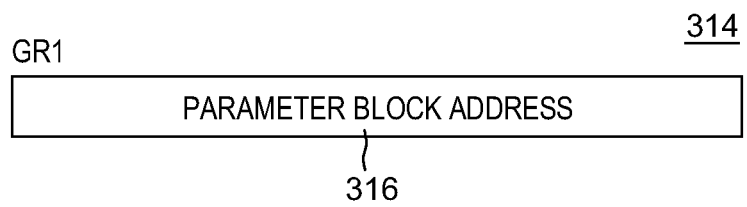
FIG. 3D
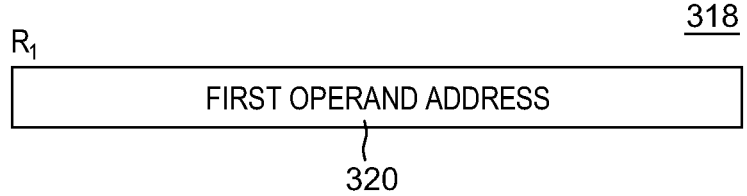
FIG. 3E
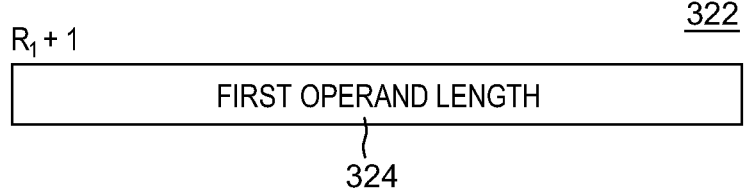
FIG. 3F

| Input to SORTL SFLR | Before the operation | After partially completing the operation (CC=1, 2, or 3) | Before resuming the operation | After completing the operation (CC=0) |
|---|---|---|---|---|
| parameter block version number | program's choice | unchanged | same as before BO | unchanged |
| model version number | zeros recommended | set | same as after PC | set |
| sort order | program's choice | unchanged | same as before BO | unchanged |
| continuation flag | zero required | set to one | same as after PC | set to zero |
| record key length | program's choice | unchanged | same as before BO | unchanged |
| record payload length | program's choice | unchanged | same as before BO | unchanged |
| operand access intent | program's choice | unchanged | same as before BO | unchanged |
| active input lists count | program's choice | unchanged | same as before BO | unchanged |
| empty input lists control | program's choice | unchanged | same as before BO | unchanged |
| empty input list flag | zero recommended | set | same as after PC | set |
| empty input list number | zeros recommended | set | same as after PC | set |
| incomplete input list flag | zero recommended | set | same as after PC | set |
| incomplete input list number | zeros recommended | set | same as after PC | set |
| continuation record recall buffer origin | program's choice | unchanged | same as before BO | unchanged |
| continuation state buffer | zeros recommended | set | same as after PC | undefined |
| input listN address | program's choice | modified | restrictions apply - refer to FIG. 5B | modified |
| input listN length | program's choice | modified | restrictions apply - refer to FIG. 5B | modified |
| merge mode | program's choice | unchanged | same as before BO | unchanged |
| first operand address | program's choice | modified | restrictions apply - refer to FIG. 5B | modified |
| first operand length | program's choice | modified | restrictions apply - refer to FIG. 5B | modified |
| second operand address (when MM=0) | program's choice | modified | restrictions apply - refer to FIG. 5B | modified |
| second operand length (when MM=0) | program's choice | modified | restrictions apply - refer to FIG. 5B | modified |
| continuation record recall buffer (when MM=0) | zeros recommended | set | same as after PC | undefined |

Explanation:
BO   begin operation
MM  Merge Mode
PC   partial completion

FIG. 5A

| Operation ending conditions | Output list processing when MM=0 | modifications permitted prior to resuming the operation | | |
|---|---|---|---|---|
| | | input lists | first operand | second operand |
| after CC=1 | concludes | IL-any: address and length | MM=0: address and length<br>MM=1: address and length | MM=0: address and length<br>MM=1: NA |
| after CC=2 and EILF=1<br>(EILN specifies input list which became empty) | continues | IL-EILN: address and length<br>IL-others: none | MM=0: none<br>MM=1: address and length | MM=0: none<br>MM=1: NA |
| after CC=2 and IILF=0 and EILF=0 | concludes | IL-any: address and length | MM=0: address and length<br>MM=1: address and length | MM=0: address and length<br>MM=1: NA |
| after CC=2 and IILF=1<br>(IILN specifies the incomplete input list) | continues | IL-IILN: address and length<br>IL-others: none | MM=0: none<br>MM=1: address and length | MM=0: none<br>MM=1: NA |
| after CC=3 | continues | IL-any: none | MM=0: none<br>MM=1: none | MM=0: none<br>MM=1: NA |

Explanation:
- IL-any: input list with any list number
- IL-EILN: input list with list number equal to EILN
- IL-IILN: input list with list number equal to IILN
- MM: Merge Mode
- NA: Not Applicable
- concludes: The output list being processed at the end of the operation is not augmented when the operation resumes
- continues: The output list being processed at the end of the operation may be augmented when the operation resumes
- none: Updates not expected: results are unpredictable if specified values are updated under specified conditions

FIG. 5B

FIRST OPERAND LOCATION BEFORE EXECUTING SORTL WITH MM = 0:

| FOSA ~600 | | 602~ FOEA |
|---|---|---|
| | | |

FIG. 6A

FIRST OPERAND LOCATION AFTER EXECUTING SORTL WITH MM = 0:

| | | | FOSA | FOEA |
|---|---|---|---|---|
| OL1 | · · · | OLN | | |

SECOND OPERAND LOCATION BEFORE EXECUTING SORTL WITH MM = 0:

| SOSA ~610 | | 612~ SOEA |
|---|---|---|
| | | |

FIG. 6C

SECOND OPERAND LOCATION AFTER EXECUTING SORTL WITH MM = 0:

| | | | SOSA | SOEA |
|---|---|---|---|---|
| OLD1 | · · · | OLDN | | |

FIRST OPERAND LOCATION BEFORE EXECUTING SORTL WITH MM = 1:

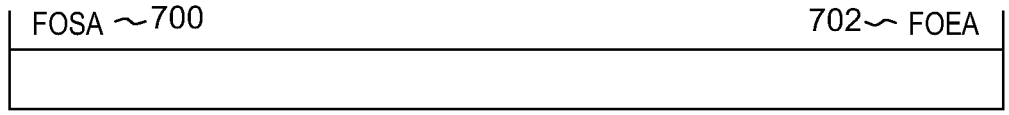

FIG. 7A

FIRST OPERAND LOCATION AFTER EXECUTING SORTL WITH MM = 1:

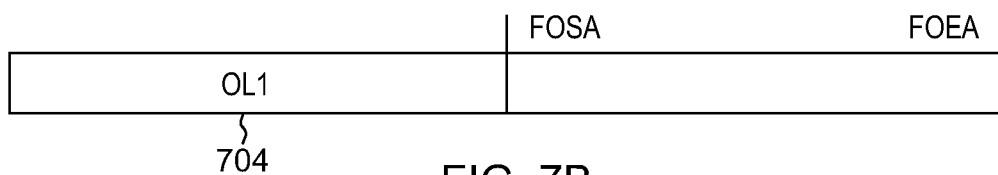

FIG. 7B

| EILCL (bin) | condition causing operation to end | results | | | | |
|---|---|---|---|---|---|---|
| | | CC | IILF | IILN | EILF | EILN |
| - | normal completion | 0 | 0 | 0 | 0 | 0 |
| - | first or second operand length is insufficient | 1 | 0 | 0 | 0 | 0 |
| - | IL0 determined to be incomplete | 2 | 1 | 0 (IL0) | 0 | 0 |
| - | ILN determined to be incomplete | 2 | 1 | N (ILN) | 0 | 0 |
| 10 | IL0 became empty (ILN may also be empty) | 2 | 0 | 0 | 0 | 0 |
| 01 | ILN became empty (IL0 may also be empty) | 2 | 0 | 0 | 0 | 0 |
| 11 | IL0 became empty (only one input list became empty) | 2 | 0 | 0 | 1 | 0 (IL0) |
| 11 | ILN became empty (only one input list became empty) | 2 | 0 | 0 | 1 | N (ILN) |
| - | CPU-determined number of bytes processed | 3 | 0 | 0 | 0 | 0 |

Explanation:
- any value
IL0 input list with list number 0
ILN input list with list number N, where N > 0

FIG. 8

OBTAIN AN INSTRUCTION TO PERFORM A SORT OPERATION ~1100

THE INSTRUCTION IS A SINGLE ARCHITECTED MACHINE INSTRUCTION OF AN INSTRUCTION SET ARCHITECTURE ~1102

EXECUTE, BY A GENERAL-PURPOSE PROCESSOR OF THE COMPUTING ENVIRONMENT, THE INSTRUCTION ~1104

THE EXECUTING INCLUDES:

SORTING A PLURALITY OF INPUT LISTS TO OBTAIN ONE OR MORE SORTED OUTPUT LISTS ~1106

PROVIDING AS OUTPUT THE ONE OR MORE SORTED OUTPUT LISTS ⏎1108

THE INSTRUCTION INCLUDES AN OPERATION CODE FIELD INCLUDING AN OPERATION CODE TO SPECIFY A SORT LIST OPERATION, AND ONE FIELD TO BE USED TO DESIGNATE ONE LOCATION, THE ONE LOCATION TO BE USED IN STORING THE ONE OR MORE SORTED OUTPUT LISTS ~1110

THE INSTRUCTION FURTHER INCLUDES ANOTHER FIELD TO BE USED TO DESIGNATE ANOTHER LOCATION, THE OTHER LOCATION TO STORE ONE OR MORE OUTPUT LIST DELINEATIONS ~1112

THE ONE FIELD IS A REGISTER FIELD, THE REGISTER FIELD DESIGNATING A REGISTER, THE REGISTER INCLUDING AN ADDRESS OF THE ONE LOCATION, AND THE OTHER FIELD IS ANOTHER REGISTER FIELD, THE OTHER REGISTER FIELD DESIGNATING ANOTHER REGISTER, THE OTHER REGISTER INCLUDING AN ADDRESS OF THE OTHER LOCATION ~1114

FIG. 11A

THE INSTRUCTION EMPLOYS ONE IMPLIED REGISTER TO DETERMINE A FUNCTION TO BE PERFORMED BY THE INSTRUCTION ~1120

THE FUNCTION IS SELECTED FROM A GROUP OF FUNCTIONS CONSISTING OF: A QUERY AVAILABLE FUNCTIONS FUNCTION, A SORT FIXED-LENGTH RECORDS FUNCTION, AND A SORT VARIABLE-LENGTH RECORDS FUNCTION ~1122

1123

THE INSTRUCTION EMPLOYS ANOTHER IMPLIED REGISTER TO LOCATE A PARAMETER BLOCK IN MEMORY USED BY THE INSTRUCTION, THE PARAMETER BLOCK INCLUDING INFORMATION USED BY THE INSTRUCTION DEPENDING ON THE FUNCTION TO BE PERFORMED ~1124

THE FUNCTION TO BE PERFORMED IS A SORT FIXED-LENGTH RECORDS FUNCTION OR A SORT VARIABLE-LENGTH RECORDS FUNCTION, AND THE PARAMETER BLOCK INCLUDES INFORMATION TO LOCATE THE PLURALITY OF INPUT LISTS AND INFORMATION TO CONTINUE THE SORTING, BASED ON THE SORTING BEING INTERRUPTED ~1126

THE ONE IMPLIED REGISTER FURTHER COMPRISES A MODE OF OPERATION INDICATOR, THE MODE OF OPERATION INDICATOR TO BE USED TO SPECIFY WHETHER A MERGE OF THE ONE OR MORE SORTED OUTPUT LISTS IS TO BE PERFORMED ~1128

THE INSTRUCTION INCLUDES AN OPERATION CODE FIELD INCLUDING AN OPERATION CODE TO SPECIFY A SORT LIST OPERATION; A FIRST REGISTER FIELD INCLUDING A DESIGNATION OF A FIRST REGISTER, THE FIRST REGISTER INCLUDING AN ADDRESS USED IN STORING THE ONE OR MORE SORTED OUTPUT LISTS; AND A SECOND REGISTER FIELD INCLUDING A DESIGNATION OF A SECOND REGISTER, THE SECOND REGISTER INCLUDING AN ADDRESS USED IN STORING ONE OR MORE OUTPUT LIST DELINEATIONS, AND WHEREIN THE INSTRUCTION EMPLOYS A FIRST IMPLIED REGISTER TO DETERMINE A FUNCTION TO BE PERFORMED BY THE INSTRUCTION AND A SECOND IMPLIED REGISTER TO LOCATE A PARAMETER BLOCK IN MEMORY USED BY THE INSTRUCTION ~1130

FIG. 11B

SORT AND MERGE INSTRUCTION FOR A GENERAL-PURPOSE PROCESSOR

This application is a continuation of co-pending U.S. patent application Ser. No. 16/181,923, filed Nov. 6, 2018, entitled "SORT AND MERGE INSTRUCTION FOR A GENERAL-PURPOSE PROCESSOR," which is hereby incorporated herein by reference in its entirety.

BACKGROUND

One or more aspects relate, in general, to facilitating processing within a computing environment, and in particular, to facilitating sort and merge processing.

One aspect of computer processing in which sort and merge processing is employed is in database processing. A database is an organized collection of data, typically partitioned into data records. Sorting and merging collections of data records are common database operations performed by software applications. When such applications are intended to be executed on a general-purpose processor, it is the application's responsibility to generate the sequence of many primitive instructions used to perform the desired database operation.

To optimize performance, an application may also attempt to optimize the sequence of primitive instructions for each model of processor on which the application may execute, thereby exacerbating the complexity of the application.

SUMMARY

Shortcomings of the prior art are overcome and additional advantages are provided through the provision of a computer program product for facilitating processing within a computing environment. The computer program product includes at least one computer readable storage medium readable by at least one processing circuit and storing instructions for performing a method. The method includes obtaining an instruction to perform a sort operation. The instruction is a single architected machine instruction of an instruction set architecture, and is executed by a general-purpose processor of the computing environment. The instruction to access one field to be used to designate a location, the location to be used to store one or more output list delineations. The executing includes sorting a plurality of input lists to obtain one or more sorted output lists, and providing as output the one or more sorted output lists.

By using a single architected instruction to perform a sorting (and/or merging) operation on a general-purpose processor, a significant subset of primitive software instructions to perform those operations are replaced by the single architected instruction. The replacement of those primitive instructions with a single architected instruction reduces program complexity and eliminates the need to include code to optimize the primitive instructions. Further, overall performance is improved.

In one example, the instruction includes an operation code field including an operation code to specify a sort list operation, and has access to another field to be used to designate another location, the other location to be used in storing the one or more sorted output lists.

As an example, the one field is a register field, the register field designating a register, the register including an address of the location, and the other field is another register field, the other register field designating another register, the other register including an address of the other location.

In one example, the instruction employs one select (e.g., implied) register to determine a function to be performed by the instruction. The function is selected from a group of functions consisting of: a query available functions function, a sort fixed-length records function, and a sort variable-length records function.

As a further example, the instruction employs another select (e.g., implied) register to locate a parameter block in memory used by the instruction. The parameter block includes information used by the instruction depending on the function to be performed. In one example, the function to be performed is a sort fixed-length records function or a sort variable-length records function, and the parameter block includes information to locate the plurality of input lists and information to continue the sorting, based on the sorting being interrupted.

In a further embodiment, the one select register further includes a mode of operation indicator to be used to specify whether a merge of the one or more sorted output lists is to be performed.

As a particular example, the instruction includes an operation code field including an operation code to specify a sort list operation; one register field including a designation of one register, the one register including an address used in storing one or more output list delineations; and another register field including a designation of another register, the other register including an address used in storing the one or more sorted output lists. The instruction employs a first implied register to determine a function to be performed by the instruction and a second implied register to locate a parameter block in memory used by the instruction.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3A depicts one format of a Sort Lists instruction, in accordance with an aspect of the present invention;

FIG. 3B depicts one example of fields of an implied register, general register 0, used by the Sort Lists instruction, in accordance with an aspect of the present invention;

FIG. 3C depicts one example of function codes for the Sort Lists instruction, in accordance with an aspect of the present invention;

FIG. 3D depicts one example of a field of an implied register, general register 1, used by the Sort Lists instruction, in accordance with an aspect of the present invention;

FIG. 3E depicts one example of contents of a register, $R_1$, specified by the Sort Lists instruction, in accordance with an aspect of the present invention;

FIG. 3F depicts one example of contents of a register, $R_1+1$, used by the Sort Lists instruction, in accordance with an aspect of the present invention;

FIG. 5A depicts one example of a summary of values for inputs to the SORTL-SFLR function, in accordance with an aspect of the present invention;

FIG. 5B depicts one example of restrictions for modifications to the input list address and length fields for the SORTL-SFLR function, in accordance with an aspect of the present invention;

FIG. 6A depicts one example of a first operand location/first operand before executing SORTL with a merge mode indication set to zero, in accordance with an aspect of the present invention;

FIG. 6B depicts one example of a first operand location/first operand after executing SORTL with a merge mode indication set to zero, in accordance with an aspect of the present invention;

FIG. 6C depicts one example of a second operand location/second operand before executing SORTL with a merge mode indication set to zero, in accordance with an aspect of the present invention;

FIG. 6D depicts one example of a second operand location/second operand after executing SORTL with a merge mode indication set to zero, in accordance with an aspect of the present invention;

FIG. 7A depicts one example of a first operand location/first operand before executing SORTL with a merge mode indication set to one, in accordance with an aspect of the present invention;

FIG. 7B depicts one example of a first operand location/first operand after executing SORTL with a merge mode indication set to one, in accordance with an aspect of the present invention;

FIG. 8 depicts one example of certain fields of a parameter block used in accordance with an aspect of the present invention;

FIGS. 11A-11B depict one example of facilitating processing within a computing environment, in accordance with an aspect of the present invention;

DETAILED DESCRIPTION

In accordance with an aspect of the present invention, a capability is provided to facilitate processing within a computing environment. As one example, a single instruction (e.g., a single architected hardware machine instruction at the hardware/software interface) is provided to perform an operation, such as to sort and/or merge data records. The instruction is executed, for instance, on a general-purpose processor. By using a single instruction to sort and/or merge data records of, for instance, a database, execution time within a processor, such as a general-purpose processor, is reduced and an amount of memory utilized in the sorting and/or merging is reduced.

Figure 1A:
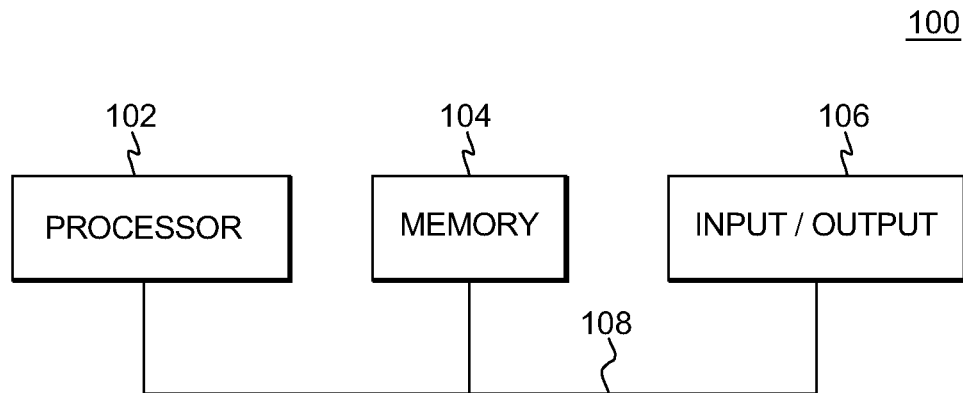
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, Armonk, N.Y., and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
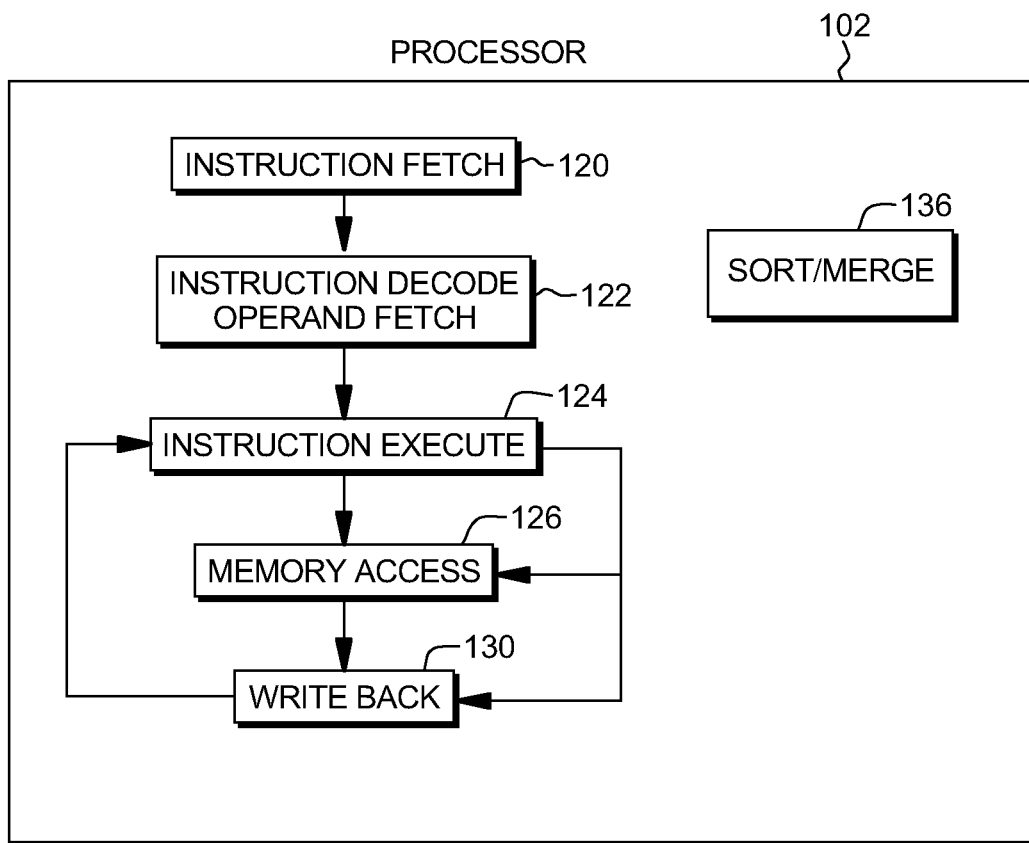
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components that provide sort/merge processing (or other processing that may use one or more aspects of the present invention). The one or more other components include, for instance, a sort/merge component (or other component) 136. Functionality provided by component 136 is described in further detail below.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
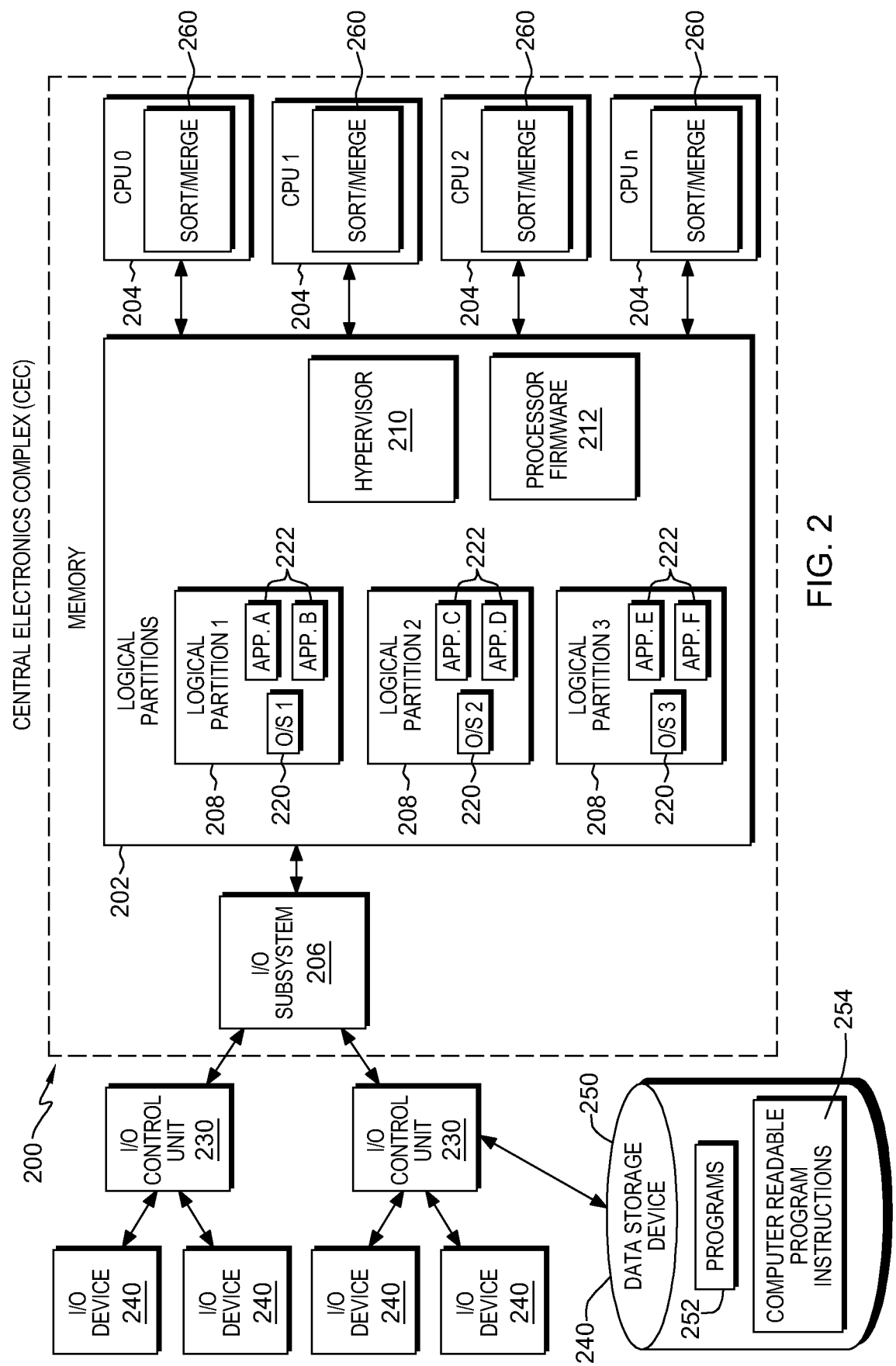
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

In one example, processor 204 includes a sort/merge component (or other component) 260 to perform one or more of sorting and/or merging (or other operations that may use one or more aspects of the present invention). In various examples, there may be one or more components performing these tasks. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a processor, such as processor 102 or 204, employs an enhanced sort facility that provides a mechanism to sort multiple lists of unsorted input data into one or more lists of sorted output data. In one example, the enhanced sort facility is installed in the system when a facility indicator is set, e.g., to one. As one particular example of the z/Architecture hardware architecture, facility bit 150 is set to, e.g., one, when the enhanced sort facility is installed in the z/Architecture architectural mode. The facility also provides, in one embodiment, a mechanism to merge multiple lists of sorted input data into a single list of sorted output data. The facility includes, for instance, a Sort Lists instruction, an embodiment of which is described below.

One embodiment of details relating to a Sort Lists instruction is described with reference to FIGS. 3A-3K. This instruction is executed, in one example, on a general-purpose processor (e.g., processor 102 or 204). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, is specified, this is only an example. The bit may be set to a different value, such as the opposite value or to another value, in other examples. Many variations are possible.

Referring to FIG. 3A, in one example, a format of a Sort Lists (SORTL) instruction 300 is an RRE format that denotes a register and register operation with an extended operation code (opcode). As an example, the instruction includes an operation code field 302 (e.g., bits 0-15) having an operation code indicating a sort and/or merge operation, a first register field ($R_1$) 304 (e.g., bits 24-27) designating a first pair of general registers and a second register field ($R_2$) 306 (e.g., bits 28-31) designating a second pair of general registers. The contents of a register designated by $R_1$ field 304 specify a location of the first operand (in storage), and the contents of a register designated by $R_2$ field 306 specify a location of the second operand (in storage). The contents of $R_1+1$ specify the length of the first operand, and the contents of $R_2+1$ specify the length of the second operand. In one example, bits 16-23 of the instruction are reserved and should contain zeros; otherwise, the program may not operate compatibly in the future. As used herein, the program is the one issuing the Sort Lists instruction. It may be a user program, an operating system or another type of program.

In one embodiment, execution of the instruction includes the use of one or more implied general registers (i.e., registers not explicitly designated by the instruction). For instance, general registers 0 and 1 are used in execution of the Sort Lists instruction, as described herein. General register 0 is used, in one example, to specify whether merging is to be performed and to specify a sort function to be performed by the instruction, and general register 1 is used to provide a location of a parameter block used by the instruction. In another example, general register 0 is not used to specify whether merging is to be performed; instead, merging is set/not set by the machine (e.g., processor) and is not changeable by a mode indicator. Other variations are possible.

As an example, with reference to FIG. 3B, a general register 0 (308) includes a merge mode field 310 (described below) and a function code field 312. In one particular example, bit positions 57-63 of general register 0 contain a function code; but in other embodiments, other bits may be used to contain the function code. When bits 57-63 of general register 0 designate an unassigned or uninstalled function code, a specification exception is recognized, in one example.

Example assigned function codes for the Sort Lists instruction are shown in FIG. 3C and include, for instance: function code 0 (313) indicating a SORTL-QAF (query available functions) function; function code 1 (315) indicating a SORTL-SFLR (sort fixed-length records) function; and function code 2 (317) indicating a SORTL-SVLR (sort variable-length records) function. Each code uses a parameter block and the size of the parameter block depends, in one example, on the function. For instance, for the SORTL-QAF function, the parameter block is 32 bytes; and for SORTL-SFLR and SORTL-SVLR, the parameter block is $576+16 \times N_{IS}$, where $N_{IS}$ is a number of input lists, as specified by an interface size. Other function codes are unassigned in this example. Although example functions and function codes are described, other functions and/or function codes may be used.

As previously indicated, general register 0 also includes a merge mode field 310. In one example, bit 56 of general register 0 specifies a mode of operation (merge mode) which applies to, for instance, the SORTL-SFLR and SORLT-SVLR functions. Bit 56 of general register 0 is ignored, in one example, when the specified function is SORTL-QAF. Further, in one example, bit positions 0-55 of general register 0 are ignored.

Further details regarding another implied register, general register 1, used by the Sort Lists instruction are described with reference to FIG. 3D. The contents of general register 1 (314) specify, for instance, a logical address 316 of the leftmost byte of a parameter block in storage. The parameter block is to be designated on a doubleword boundary, in one example; otherwise a specification exception is recognized. Further details regarding the parameter block are described further below.

For the specified functions (e.g., SORTL-QAF, SORTL-SFLR, SORTL-SVLR), the contents of general registers 0 and 1 are not modified. Further, in one example, $R_1$ field 304 designates an even-odd pair of general registers. It is to designate an even-numbered register and is not to designate general register 0; otherwise, a specification exception is recognized. When the specified function is SORTL-SFLR or SORTL-SVLR, as shown in FIGS. 3E-3F, the contents of a general register $R_1$ 318 specify, for instance, a logical address 320 of the leftmost byte of the first operand, and the contents of a general register $R_1+1$ (322) specify a length 324 of the first operand in, e.g., bytes. When the specified function is SORTL-SFLR or SORTL-SVLR, the first operand, e.g., is to be designated on a doubleword boundary; otherwise a specification exception is recognized. Data, in the form of records, is selected from a set of input lists and is stored at the first operand location (e.g., beginning at the address specified using $R_1$). When the SORTL-QAF function is specified, the contents of general registers $R_1$ and $R_1+1$ are ignored.

Figure 3G:
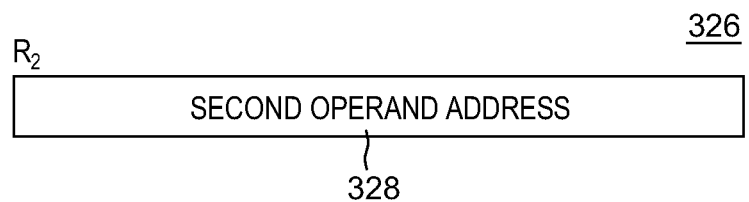
FIG. 3G depicts one example of contents of a register, $R_2$, specified by the Sort Lists instruction, in accordance with an aspect of the present invention.
Figure 3H:
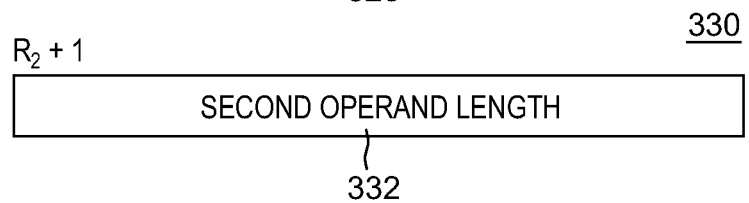
FIG. 3H depicts one example of contents of a register, $R_2+1$, used by the Sort Lists instruction, in accordance with an aspect of the present invention.

Moreover, for the specified functions (e.g., SORTL-QAF, SORTL-SFLR, SORTL-SVLR), in one example, $R_2$ field 306 designates an even-odd pair of general registers. It is to designate an even-numbered register and is not to designate general register 0; otherwise, a specification exception is recognized. When the specified function is SORTL-SFLR or SORTL-SVLR, and merge mode (MM) is zero, as shown in FIGS. 3G-3H, the contents of a general register $R_2$ 326 specify, for instance, a logical address 328 of the leftmost byte of the second operand, and the contents of a general register $R_2+1$ (330) specify a length 332 of the second operand in, e.g., bytes. When the specified function is SORTL-SFLR or SORTL-SVLR, and merge mode (MM) is zero, the second operand is to be designated on a doubleword boundary; otherwise a specification exception is recognized, in one example. The starting address and length of each output list, referred to as output list delineations (OLD), are stored at the second operand location (e.g., beginning at the address specified using $R_2$) when MM is zero. When the SORTL-QAF function is specified, or MM is one, the contents of general registers $R_2$ and $R_2+1$ are ignored.

In execution, in one embodiment, a function specified by the function code in general register 0 is performed. As part of the operation when the specified function is SORTL-SFLR or SORTL-SVLR, the following occurs, in one embodiment:

The address in general register $R_1$ is incremented by the number of bytes stored at the first operand location, and the length in general register $R_1+1$ is decremented by the same number.

When MM is zero, the address in general register $R_2$ is incremented by the number of bytes stored at the second operand location, and the length in general register $R_2+1$ is decremented by the same number.

In one example, the formation and updating of the addresses and lengths are dependent on the addressing mode.

In the 24-bit addressing mode, the following apply, in one embodiment:

The contents of bit positions 40-63 of general registers 1, $R_1$, and $R_2$ constitute the addresses of the parameter block, first operand, and second operand, respectively, and the contents of bit positions 0-39 are ignored.

Bits 40-63 of the updated first operand and second operand addresses replace the corresponding bits in general registers $R_1$ and $R_2$, respectively. Carries out of bit position 40 of the updated addresses are ignored, and the contents of bit positions 32-39 of general registers $R_1$ and $R_2$ are set to zeros. The contents of bit positions 0-31 of general registers $R_1$ and $R_2$ remain unchanged.

The contents of bit positions 32-63 of general registers $R_1+1$ and $R_2+1$ form 32-bit unsigned binary integers which specify the number of bytes in the first and second operands, respectively. The contents of bit positions 0-31 of general registers $R_1+1$ and $R_2+1$ are ignored.

Bits 32-63 of the updated first operand and second operand lengths replace the corresponding bits in general registers $R_1+1$ and $R_2+1$, respectively. The contents of bit positions 0-31 of general registers $R_1+1$ and $R_2+1$ remain unchanged.

In the 31-bit addressing mode, the following apply, in one embodiment:

The contents of bit positions 33-63 of general registers 1, $R_1$, and $R_2$ constitute the addresses of the parameter block, first operand, and second operand, respectively, and the contents of bit positions 0-32 are ignored.

Bits 33-63 of the updated first operand and second operand addresses replace the corresponding bits in general registers $R_1$ and $R_2$, respectively. Carries out of bit position 33 of the updated addresses are ignored, and the content of bit position 32 of general registers $R_1$ and $R_2$ is set to zero. The contents of bit positions 0-31 of general registers $R_1$ and $R_2$ remain unchanged.

The contents of bit positions 32-63 of general registers $R_1+1$ and $R_2+1$ form 32-bit unsigned binary integers which specify the number of bytes in the first and second operands, respectively. The contents of bit positions 0-31 of general registers $R_1+1$ and $R_2+1$ are ignored.

Bits 32-63 of the updated first operand and second operand lengths replace the corresponding bits in general registers $R_1+1$ and $R_2+1$, respectively. The contents of bit positions 0-31 of general registers $R_1+1$ and $R_2+1$ remain unchanged.

In the 64-bit addressing mode, the following apply, in one embodiment:

The contents of bit positions 0-63 of general registers 1, $R_1$, and $R_2$ constitute the addresses of the parameter block, first operand, and second operand, respectively.

Bits 0-63 of the updated first operand and second operand addresses replace the corresponding bits in general registers $R_1$ and $R_2$, respectively. Carries out of bit position 0 of the updated addresses are ignored.

The contents of bit positions 0-63 of general registers $R_1+1$ and $R_2+1$ form 64-bit unsigned binary integers which specify the number of bytes in the first and second operands, respectively.

Bits 0-63 of the updated first operand and second operand lengths replace the corresponding bits in general registers $R_1+1$ and $R_2+1$, respectively.

In the access-register mode, access registers 1, $R_1$, and $R_2$ specify the address spaces containing the parameter block, first operand, and second operand, respectively.

Further details regarding the various functions are described below:

Function Code 0: SORTL-QAF (Query Available Functions)

The SORTL-QAF (query) function provides a mechanism to indicate the availability of all installed functions, installed parameter block formats, and interface sizes available. An interface size is the number of input lists available to the program. The size of the parameter block for the SORT-SFLR and SORT-SVLR functions is proportional to the interface size specified by the program.

Figure 3I:
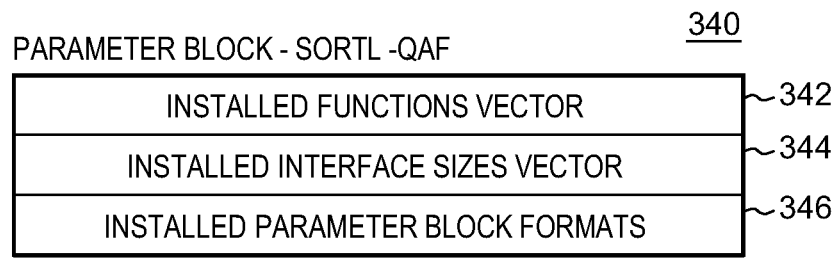
FIG. 3I depicts one example of contents of a parameter block used by the SORTL-QAF function of the Sort Lists instruction, in accordance with an aspect of the present invention.
Figure 3J:
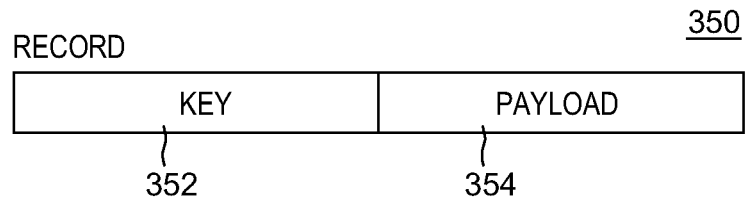
FIG. 3J depicts one example of a fixed-length record format used by the Sort Lists instruction, in accordance with an aspect of the present invention.

One example format of the parameter block for the SORTL-QAF function is described with reference to FIG. 3I. In one example, a parameter block 340 for the SORTL-QAF function (e.g., function code 0) includes an installed functions vector 342, an installed interface sizes vector 344, and an installed parameter block formats vector 346. In one particular example, these vectors are stored to bytes 0-15, byte 16, and bytes 24-25, respectively, of the parameter block. Each of the vectors is further described below.

As an example, bits 0-127 of installed functions vector 342 correspond to function codes 0-127, respectively, of the Sort Lists instruction. When a bit is, e.g., one, the corresponding function is installed; otherwise, the function is not installed.

Further, in one example, bits 0-7 of installed interface sizes vector 344 indicate the interface sizes available to the program. An interface size is the number of input lists to be specified by the program for the SORT-SFLR and SORTL-SVLR functions. Bits 0-7 of installed interface sizes vector 344 correspond to the following interface sizes, in one example: Bits 0, 1, 5-7 reserved; bit 2-32 input lists; bit 3-64 input lists; and bit 4-128 input lists. Other examples are also possible.

When a bit of installed interface sizes vector 344 is, e.g., one, the corresponding interface size is available to the program. One or more bits may be stored as ones. For example, a value of 00101000 binary indicates interfaces sizes of 32 and 128 input lists are available. In one example, bits 0-1 and 5-7 are reserved and stored as zeros. Further, in one example, the interface size of 32 input lists is available when the enhance sort facility is installed. Therefore, bit 2 is stored as a one. Other examples are also possible.

In addition to the above, in one example, bits 0-15 of installed parameter block formats vector 346 correspond to parameter block formats 0-15, respectively. When a bit is, e.g., one, the corresponding parameter block format is installed; otherwise, the parameter block format is not installed. In one example, zeros are stored to reserved bytes 17-23 and 26-31 of the parameter block.

The contents of general registers $R_1$, $R_2$, $R_1+1$, and $R_2+1$ are ignored by the SORT-QAF function.

A PER (program event recording) storage alteration event is recognized, when applicable, for the parameter block. A PER zero address detection event is recognized, when applicable, for the parameter block.

Condition code 0 is set when execution of the SORTL-QAF function completes; condition codes 1, 2, and 3 are not applicable to the query function, in one example.

Function Code 1: SORTL-SFLR (Sort Fixed-Length Records)

In one example, a set of input lists is sorted and stored as a set of output lists at the first operand location. Each list is a set of records, and with reference to FIG. 3J, each record 350 includes a key 352 (e.g., a fixed-length key) and a payload 354 (e.g., a fixed-length payload).

Records from the input lists are sorted based on the values of the keys. The records may be sorted in ascending or descending order, as specified in a sort order (SO) field of the parameter block associated with function code 1, described below. The records of an input list may, or may not, be listed in sorted order.

The records of an output list may be sourced from multiple input lists, and are stored in sorted order. The number of output lists stored at the first operand location depends on the input data. In one example, when every active input list contains records listed in the same order as specified in the SO field, only one output list is produced.

As indicated above, bit 56 of general register 0 specifies a mode of operation, referred to as merge mode (MM), which applies to the SORTL-SFLR function. When merge mode is, e.g., zero, for each output list stored at the first operand location, a corresponding output list delineation (OLD) is stored at the second operand location. Each OLD includes, for instance, an 8-byte OLD-address, which designates the location of the first record in the corresponding output list, and an 8-byte OLD-length, which specifies the length, in, e.g., bytes, of the corresponding output list. When merge mode is one, the input lists are considered presorted. That is, every active input list is considered to contain records in the same order as specified by the SO field of the parameter block.

When MM is one and each input list is presorted, the result stored at the first operand location is a single output list of records in sorted order. When MM is one and each input list is not presorted, results are unpredictable.

When MM is, e.g., one, the contents of general registers $R_2$ and $R_2+1$ are ignored and no information is stored at the second operand location. When MM is one, procedures used to distinguish separations between output lists may not be performed, thereby potentially improving the performance of the operation. When MM is one, data is not stored to a continuation record recall buffer, described below.

To generate a single list of records in sorted order from a set of records in random order, a program may perform the following procedure, in one example:
1. Evenly partition the set of records among an initial set of lists, where each list contains records in random order. Execute the Sort Lists instruction with the initial set of lists as input lists and merge mode equal to zero, to generate an intermediate set of lists (each of which contains records in sorted order), and the storage locations and lengths for each list of the intermediate set of lists.
2. Execute the Sort Lists instruction with the intermediate set of lists as input lists and merge mode equal to one, to generate the final and single list, which contains the records in sorted order.

Figure 4A:
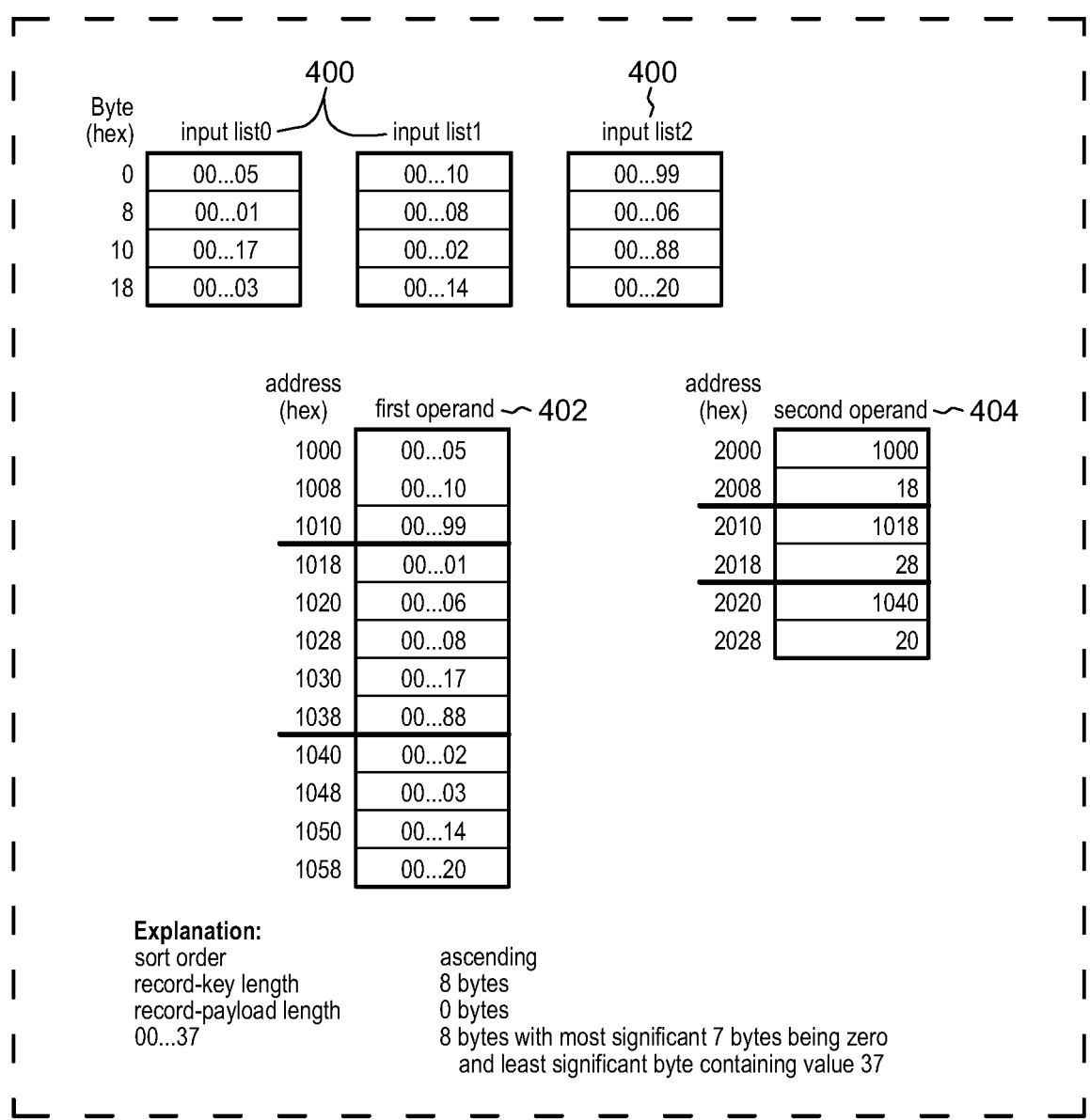
FIGS. 4A-4B depict SORTL-SFLR examples, in accordance with one or more aspects of the present invention.

One example of the SORTL-SFLR with merge mode equal to zero is illustrated in FIG. 4A. The inputs and resulting outputs are included in the example. As shown, there are three input lists 400: input list0, input list1 and input list2. Further, an example of a resulting first operand 402 and a second operand 404 are depicted. In one example, there are three lists in first operand 402 (FIG. 4A), and as shown in second operand 404, one begins at address 1000 and has a length of 18; another begins at address 1018 and has a length of 28; and a third begins at address 1040 and has a length of 20.

Figure 4B:
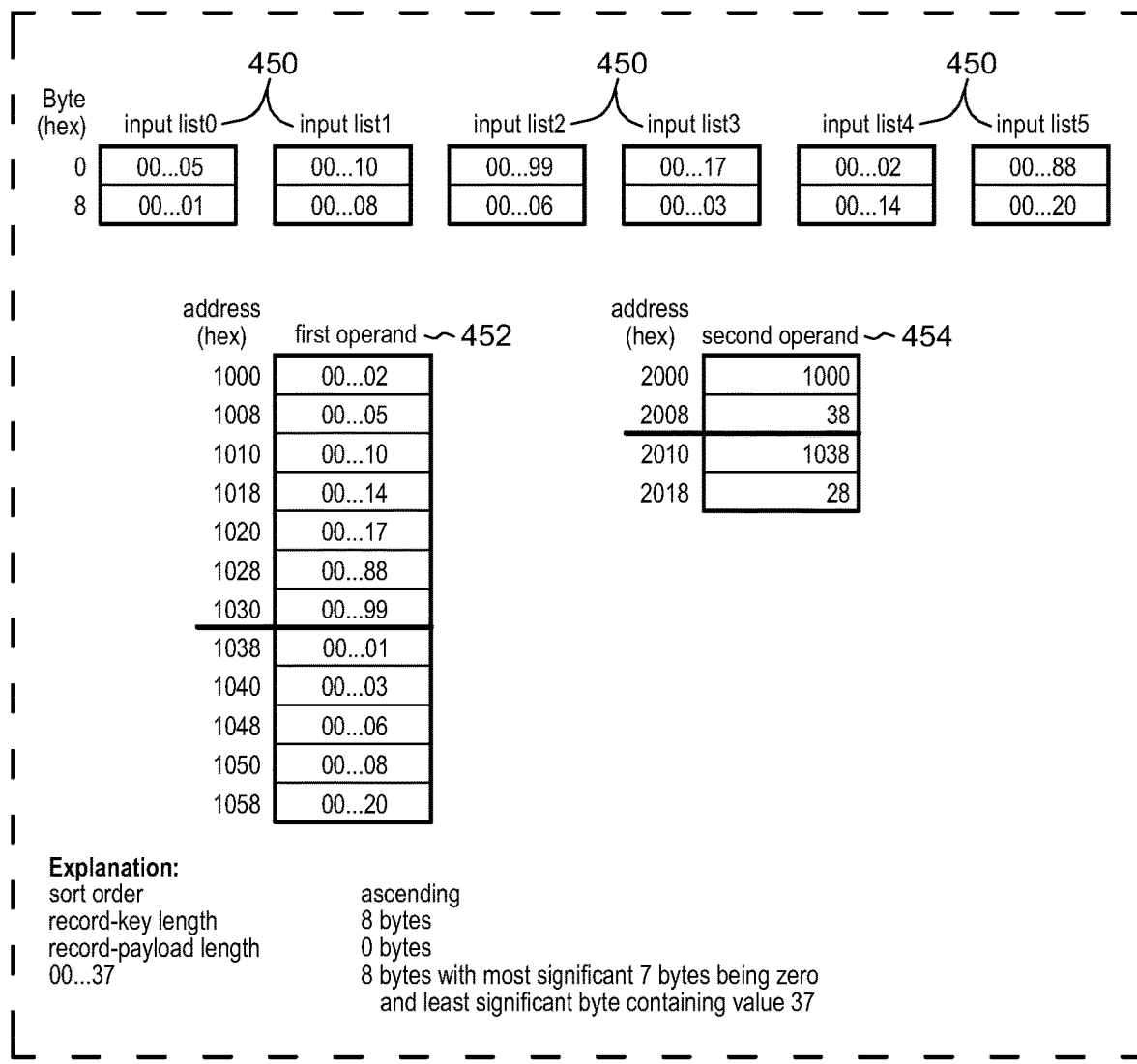

In one example, when two operations perform the same SORTL-SFLR function with merge mode equal zero on the same set of unsorted input records and the only difference between the two operations is the number of input lists used to specify the input data, the operation with the larger number of input lists results in a smaller number of output lists. FIG. 4B illustrates an example of using six input lists 450 to operate on the same input data as the example in FIG. 4A, which uses three input lists. A resulting first operand 452 with two output lists, instead of three, and a second operand 454 providing delineations of the two output lists are also depicted.

Figure 3K:
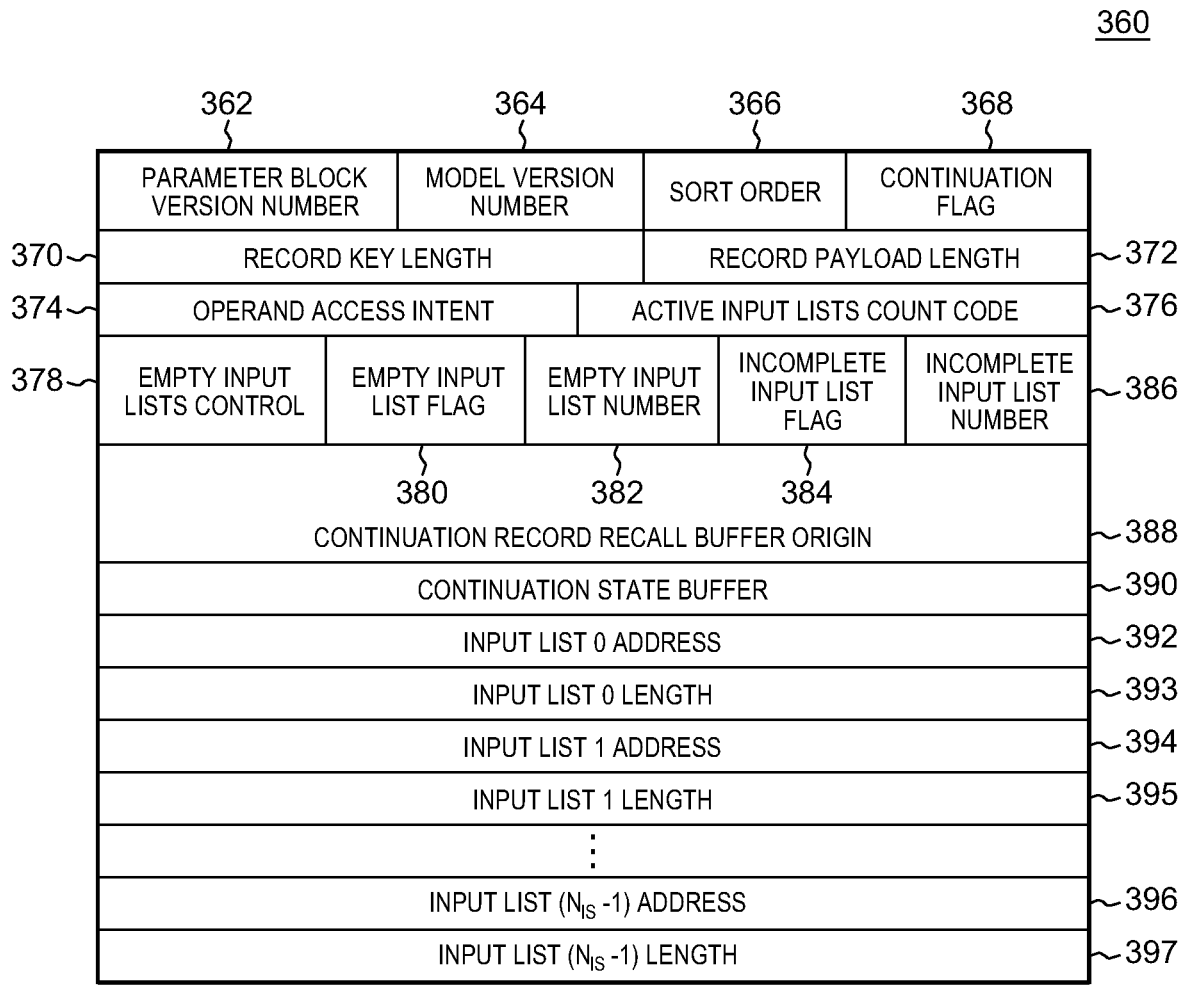
FIG. 3K depicts one example of contents of a parameter block used by the SORTL-SFLR function of the Sort Lists instruction, in accordance with an aspect of the present invention.

As indicated, the SORTL-SFLR function uses a parameter block, an example of which is described with reference to FIG. 3K. In the example parameter block described herein, specific locations within the parameter block for specific fields and specific sizes of the fields are indicated (e.g., specific bytes and/or bits). However, other locations and/or sizes may be provided for one or more of the fields. Further, although the setting of a bit to a particular value e.g., one or zero, is specified, this is only an example. The bit may be set to a different value, such as the opposite value or to another value, in other examples. Many variations are possible.

In one example, a parameter block 360 for the SORTL-SFLR function includes the following:

Parameter Block Version Number (PBVN) 362: Bytes 0-1 of the parameter block specify the version and size of the parameter block. Bits 0-7 of the PBVN have the same format and definition as bits 0-7 of the installed interface sizes list vector (byte 16) of the parameter block for the SORTL-QAF (query) function. Bits 0-7 specify the number of input lists described in the parameter block, $N_{IS}$. The size of the parameter block, in bytes, is determined by evaluating the formula $(576+16 \times N_{IS})$. One bit of bits 0-7 is to have a value of one; otherwise, a general operand data exception is recognized. Bits 8-11 of the PBVN are reserved and should contain zeros; otherwise, the program may not operate compatibly in the future. Bits 12-15 of the PBVN contain an unsigned binary integer specifying the format of the parameter block. The SORTL-QAF function provides the mechanism of indicating the parameter block formats available. When the size or format of the parameter block specified is not supported by the model, a general operand data exception is recognized. The PBVN is specified by the program and is not modified during execution of the instruction.

Model Version Number (MVN) 364: Byte 2 of the parameter block is an unsigned binary integer identifying the model which executed the instruction. The MVN is updated during execution of the instruction by, e.g., the processor. The value stored in the MVN is model-dependent.

When the continuation flag (CF) 368, described below, is one, the MVN is an input to the operation. When CF is one and the MVN identifies the same model as the model currently executing the instruction, data from the continuation state buffer (CSB) 390, described below, may be used to resume the operation. When CF is one and the MVN identifies a different model than the model currently executing the instruction, part, or all of the CSB field may be ignored.

In one example, the program initializes the MVN to zeros. It is expected that the program does not modify the MVN in the event the instruction is to be re-executed for the purpose of resuming the operation; otherwise results are unpredictable.

Sort Order (SO) 366: Bit 56 of the parameter block, when zero, specifies an ascending sort order, and when one, specifies a descending sort order. When ascending sort order is specified, each record of an output list contains a key that is greater than, or equal to, the key of the adjacent record on, e.g., the left, in the same output list. When descending sort order is specified, each record of an output list contains a key that is less than, or equal to, the key of the adjacent record on the, e.g., left, in the same output list. The SO is not updated during execution of the instruction.

Continuation Flag (CF) 368: Bit 63 of the parameter block, when one, indicates the operation is partially complete and the contents of the continuation state buffer 390, and when merge mode (MM) is zero, the contents of a continuation record recall buffer may be used to resume the operation. The program is to initialize the continuation flag (CF) to zero and not modify the CF in the event the instruction is to be re-executed for the purpose of resuming the operation; otherwise results are unpredictable. The processor, in one example, modifies the CF in the event the instruction is to be re-executed.

Record Key Length 370: Bytes 10-11 of the parameter block contain an unsigned binary integer specifying the size, in bytes, of the keys, in the records processed during the operation. A general operand data exception is recognized for any of the following conditions, in one example:

A key size of zero bytes is specified.
A key size which is not a multiple of 8 is specified.
A key size larger than 4096 bytes is specified.
The record key length is not updated during execution of the instruction.

Record Payload Length 372: When the SORTL-SFLR function is specified, bytes 14-15 of the parameter block contain an unsigned binary integer specifying the size, in bytes, of the payloads, in the records processed during the operation. A general operand data exception is recognized for any of the following conditions, in one example:

A payload size which is not a multiple of 8 is specified.
The sum of the key and payload sizes specified is larger than 4096 bytes.
A payload size of zero is valid.

When the SORTL-SVLR function is specified, the record payload length field of the parameter block is ignored. The record payload length is not updated during execution of the instruction.

Operand Access Intent (OAI) 374: Bits 0-1 of byte 32 of the parameter block signal future access intent to the CPU for input lists and the first operand. Provided access intents may be used to modify cache line installation and replacement policies for the corresponding storage locations at various levels of cache in the storage hierarchy.

When bit 0 of the OAI field is one, storage locations designated to contain data for any active input list will be referenced as one or more operands of subsequent instructions. When bit 0 of the OAI field is zero, storage locations designated to contain data for any active input list will not be referenced as one or more operands of subsequent instructions.

When bit 1 of the OAI field is one, storage locations designated to contain the first operand will be referenced as one or more operands of subsequent instructions. When bit 1 of the OAI field is zero, storage locations designated to contain the first operand will not be referenced as one or more operands of subsequent instructions.

It is not guaranteed that the CPU uses this information. The duration this information may be used is undefined, but is finite.

When the next-sequential instruction after Next Instruction Access Intent (NIAI) is Sort Lists (SORTL), the execution of SORTL is not effected by NIAI.

The OAI is not updated during execution of the instruction.

Active Input Lists Count Code (AILCC) 376: Bits 1-7 of byte 33 of the parameter block are a 7-bit unsigned integer that specifies the number of the input list which denotes the boundary between active and inactive input lists. Input lists with list numbers, e.g., less than or equal to the value of the AILCC field are in the active state. Input lists with list numbers, e.g., greater than the value of the AILCC field are in the inactive state. The number of input lists in the active state is one more than the value in the AILCC field.

Input lists in the active state participate in the operation. Input lists in the inactive state do not participate in the operation.

Bit 0 of byte 33 of the parameter block is reserved and should contain zero; otherwise the program may not operate compatibly in the future.

When the value of the AILCC field plus one is greater than the number of input lists described in the parameter block, as specified by bits 0-7 of the PBVN field, a general operand data exception is recognized, in one example.

The value specified in the AILCC field does not effect the size of the parameter block. Access exceptions apply to references to fields of the parameter block specifying an input list address or length corresponding to an input list in the inactive state.

The AILCC is not updated during execution of the instruction.

Empty Input Lists Control (EILCL) 378: When bit 0 of byte 40 of the parameter block is one, the operation ends when the length of input list0 becomes zero during the operation. When bit 0 of byte 40 of the parameter block is zero, the operation continues to proceed when the length of input list0 becomes zero during the operation. When bit 1 of byte 40 of the parameter block is one, the operation ends when the length of an active input list, other than input list0, becomes zero during the operation. When bit 1 of byte 40 of the parameter block is zero, the operation continues to proceed when the length of an active input list, other than input list0, becomes zero during the operation.

When the length of an active input list is initially zero before execution of the instruction, the corresponding bit of the EILCL does not apply.

The EILCL is not updated during execution of the instruction.

It is expected that the program does not modify the EILCL in the event the instruction is to be re-executed for the purpose of resuming the operation; otherwise results are unpredictable.

Empty Input List Flag (EILF) 380: When the EILCL is 11 binary, and the operation ends due to the updated length of an active input list being equal to zero, and condition code 2 is set, the value of one is stored, e.g., by the processor, to bit 2, of byte 40, of the parameter block; otherwise the value of zero is stored to bit 2, of byte 40, of the parameter block. When the EILF contains a value of one, the input list number of the input list which became empty during the operation is placed in the EILN field of the parameter block. In one example, the program initializes the EILF to zero.

The EILF may be referenced at the beginning of execution of the instruction when the operation is being resumed. It is expected that the program does not modify the EILF in the event the instruction is to be re-executed for the purpose of resuming the operation; otherwise results are unpredictable.

Empty Input List Number (EILN) 382: When conditions cause a value of one to be stored in the EILF field, the input list number of the input list which became empty during the operation is stored, e.g., by the processor, in byte 41 of the parameter block; otherwise the value of zero is stored in byte 41 of the parameter block.

The EILN is ignored at the beginning of the operation. In one example, the program initializes the EILN to zeros.

Incomplete Input List Flag (IILF) 384: When the operation ends as a result of attempting to process an incomplete input list, the value of one is stored, e.g., by the processor, to bit 0, of byte 46, of the parameter block; otherwise the value of zero is stored to bit 0, of byte 46, of the parameter block. An active input list is considered to be incomplete when the corresponding input list length is greater than zero and less than the number of bytes of the record designated by the input list address. This condition may exist at the beginning of the operation, or it may be encountered during the operation. When the IILF contains a value of one, the input list number, of the incomplete input list encountered, is placed in the IILN field of the parameter block. In one example, the program initializes the IILF to zero.

When the operation ends with setting condition code 2 and the resulting value in the IILF field is zero, the operation ended due to an empty input list. When the operation ends with setting condition code 2 and the resulting value in the IILF field is one, the operation ended due to an incomplete input list.

The IILF may be referenced at the beginning of the execution of the instruction when the operation is being resumed. It is expected that the program does not modify the IILF in the event the instruction is to be re-executed for the purpose of resuming the operation; otherwise results are unpredictable.

Incomplete Input List Number (IILN) 386: When conditions cause a value of one to be stored in the IILF field, the input list number, of the incomplete input list encountered, is stored, e.g., by the processor, in byte 47 of the parameter block; otherwise the value of zero is stored in byte 47 of the parameter block. When multiple input lists are incomplete, it is model dependent which incomplete input list number is stored to the IILN field. In one example, the program initializes the IILN to zero.

The IILN is ignored at the beginning of the operation.

Continuation Record Recall Buffer Origin 388: A 4 K-byte buffer in storage, called the continuation record recall buffer, is provided by the program for the CPU to store and reference data between two executions of the same Sort Lists instruction, in case an operation ends and may be resumed later. Fifty-two bits, starting with bit 0 of byte 56, through bit 3 of byte 62, of the parameter block contain an unsigned binary integer used in the formation of the continuation record recall address, which is aligned on a 4 K-byte boundary. The continuation record recall address is, e.g., the logical address of the leftmost byte of the continuation record recall buffer.

In the 24-bit addressing mode, bits 40-51 of the continuation record recall buffer origin with 12 zeros appended to the right form the continuation record recall address. In the 31-bit addressing mode, bits 33-51 of the continuation record recall buffer origin with 12 zeros appended to the right form the continuation record recall address. In the 64-bit addressing mode, bits 0-51 of the continuation record recall buffer origin with 12 zeros appended to the right form the continuation record recall address.

In the access-register mode, access register 1 specifies the address space containing the continuation record recall buffer in storage.

When merge mode (MM) is zero, the operation ends after storing one or more records, and normal completion does not occur, the key of the last record stored to the first operand is also stored to the continuation record recall buffer. When MM is one, the continuation record recall buffer origin is ignored.

The continuation record recall buffer origin is not modified during execution of the instruction.

It is expected the program does not modify the continuation record recall buffer origin in the event the instruction is to be re-executed for the purpose of resuming the operation; otherwise results are unpredictable.

Continuation State Buffer (CSB) 390: When conditions cause a value of one to be stored in the CF field, internal state data is stored, e.g., by the processor, to bytes 64-575 of the parameter block; otherwise bytes 64-575 of the parameter block are undefined and may be modified. The internal state data stored is model-dependent and may be used subsequently to resume the operation when the instruction is re-executed. In one example, the program initializes the continuation state buffer to zeros. It is expected that the program does not modify the continuation state buffer in the event the instruction is to be re-executed for the purpose of resuming the operation; otherwise results are unpredictable.

As an example, the internal state data includes information relating to the input lists, such as information regarding previous comparisons of records of the input lists to determine the next comparisons to be made. The internal state data is model-dependent in that it may be stored or presented differently depending on the processor model. Other variations are possible.

In one embodiment, the instruction may be partially completed by one model in a configuration and execution may resume on a different model in the configuration. Although different models, in one embodiment, may maintain different internal states, in one example, each model is to be capable of interpreting those contents of the CSB, if any, which are employed to resume the operation. When an operation resumes, the MVN indicates which contents of the CSB, if any, the machine is capable of interpreting.

Input ListN Address 392, 394, 396: The parameter block defines multiple input lists. The number of input lists defined in the parameter block, $N_{LS}$, is specified by bits 0-7 of PBVN 362. The input lists are numbered from zero to ($N_{LS}-1$). For each input list, the parameter block specifies, e.g., an 8-byte input list address. For input list number N, the contents of bytes 576+16×N through 583+16×N, of the parameter block, specify, e.g., the logical address of the leftmost byte of input list number N in storage.

Each input list address corresponding to an input list in the active state, as specified by the AILCC field, is an input to the operation and is updated by the operation. Each input list address corresponding to an input list in the inactive state, as specified by the AILCC field, is ignored by the operation.

When an input list address is an input to the operation, the following applies, in one embodiment:

In 24-bit addressing mode, bits 40-63, of the input list address, designate the location of the leftmost byte of the input list in storage, and the contents of bits 0-39, of the input list address are treated as zeros.

In 31-bit addressing mode, bits 33-63, of the input list address, designate the location of the leftmost byte of the input list in storage, and the contents of bits 0-32, of the input list address are treated as zeros.

In 64-bit addressing mode, bits 0-63, of the input list address, designate the location of the leftmost byte of the input list in storage.

In the access-register mode, access register 1 specifies the address space containing the active input lists in storage.

For the input lists in the active state, the corresponding input list address is to be designated on a doubleword boundary; otherwise, a general operand data exception is recognized, in one example.

When an input list address is updated by the operation, the following applies, in one embodiment:

When one or more records of the input list have been processed as part of the operation, the corresponding input list address is incremented by the number of bytes which the processed records occupy in storage. The formation and updating of the input list address are dependent on the addressing mode.

In 24-bit addressing mode, bits 40-63 of the updated input list address replace the corresponding bits in the input list address field of the parameter block, a carry out of bit position 40 of the updated input list address is ignored, and the contents of bit positions 0-39 of the input list address field of the parameter block are set to zeros.

In 31-bit addressing mode, bits 33-63 of the updated input list address replace the corresponding bits in the input list address field of the parameter block, a carry out of bit position 33 of the updated input list address is ignored, and the contents of bit positions 0-32 of the input list address field of the parameter block are set to zeros.

In 64-bit addressing mode, bits 0-63 of the updated input list address replace the corresponding bits in the input list address field of the parameter block, and a carry out of bit position 0 of the updated input list address is ignored.

In 24- and 31-bit addressing modes, when execution of the instruction ends and the instruction is not suppressed, nullified, or terminated, each 64-bit input list address corresponding to an active input list is updated, even when the address is not incremented.

Input ListN Length 393, 395, 397: For each input list, the parameter block specifies an 8-byte input list length. For input list number N, bytes 584+16×N through 591+16×N, of the parameter block, contain an unsigned integer which specifies the number of bytes in input list number N.

Each input list length corresponding to an input list in the active state, as specified by the AILCC field, is an input to the operation and is updated by the operation. Each input list length corresponding to an input list in the inactive state, as specified by the AILCC field, is ignored by the operation.

In the various addressing modes, the contents of bit positions 0-63 of an input list length field specify the length of the corresponding input list.

When one or more records of an input list have been processed as part of the operation, the corresponding input list length is decremented by the number of bytes which the processed records occupy in storage. In the various addressing modes, bits 0-63 of an updated input list length replace bits 0-63 in the corresponding input list length field of the parameter block.

Reserved: There are a number of reserved fields in the parameter block (e.g., the fields that do not include other information). As an input to the operation, reserved fields should contain zeros; otherwise, the program may not operate compatibly in the future. When the operation ends, reserved fields may be stored as zeros or may remain unchanged.

FIGS. 5A-5B summarize one example of the original and final values for inputs to the SORTL-SFLR function, including fields in the parameter block.

In one embodiment, it is not required, and is not expected, for the program to modify the parameter block between ending the operation with condition code 3 set and branching back to the instruction, to re-execute the instruction, for the purpose of resuming the operation.

In one embodiment, the SORTL-SFLR function includes multiple comparisons between keys of records from different input lists. When comparing keys, the following applies, in one example:

Keys are treated as unsigned-binary integers, also referred to as unstructured data.

It may not be necessary to access all bytes of each key being compared when determining which key contains the lowest or highest value. The number of bytes of each key compared at a time, referred to as unit of key comparison, is model dependent. The number of bytes of a key that are accessed is an integral number of units of key comparison.

When comparing keys of equal value, in one example, the key from the input list with the highest input list number is selected to be in sort order before other keys with the same value. In this case, the corresponding record from the input list with the highest input list number is stored to the first operand before other records with the same key value. This applies for ascending and descending sort orders.

One implementation may maintain a history of prior comparisons between records from the active input lists. When the history is available and applicable, in place of accessing and comparing records which were previously compared, the history may be referenced. References to the history reduce the execution time required to generate results, improving processing within the computing environment.

The SORTL-SFLR function includes selecting records from a set of input lists, in the sort order specified, and placing the selected records at the first operand location. As the operation proceeds, current values for the first operand address and addresses for the active input lists are maintained. The function proceeds in units of operation. During each unit of operation, for each active input list, the key designated by the corresponding current input list address is examined and one record is placed at the first operand location.

When merge mode (MM) is zero, the active input lists designate lists, each of which is treated as containing records, from, e.g., left to right, in random order. When MM is zero, the records stored to the first operand location constitute one or more output lists, and the starting address and length of each output list is stored to the second operand location. When MM is zero, each unit of operation includes the following steps, in the order specified, as one example:

1. Determine if the next record to store to the first operand location may be included in the most recent output list (the output list which includes the record most recently stored to the first operand location), as follows:

When the continuation flag (CF) is zero and the first unit of operation is being processed, no records have been stored to the first operand location, and the next record to store will be the first record of an output list.

When CF is one, the prior execution of the instruction ended with condition code 1, and the first unit of operation is being processed for the current execution of the instruction, the next record to store will be the first record of an output list.

When CF is one, IILF is zero, EILF is zero, the prior execution of the instruction ended with condition code 2, and the first unit of operation is being processed for the current execution of the instruction, the next record to store will be the first record of an output list.

When CF is one, IILF or EILF is one, the prior execution of the instruction ended with condition code 2, and the first unit of operation is being processed for the current execution of the instruction, the next record to store may be included in the most recent output list.

When CF is one, the prior execution of the instruction ended with condition code 3, and the first unit of operation is being processed for the current execution of the instruction, the next record to store may be included in the most recent output list.

When the unit of operation being processed is not the first unit of operation for the current execution of the instruction, the next record to store may be included in the most recent output list.

2. When the next record to store may be included in the most recent output list, determine the set of records which qualify to be included in the most recent output list. For each input list which is active, not empty and not incomplete, compare the key of the record designated by the current input list address (current input key) to the key of the record most recently stored to the first operand location (previously stored key). For this purpose, the reference to the previously stored key is not a reference to the first operand location. Instead, it is a reference to the input list from which the key was selected, or it is a reference to the continuation record recall buffer. It is a reference to the continuation record recall buffer when the operation is being resumed and the current execution of the instruction has not yet placed any records at the first operand location.

When the sort order is ascending and the value of the current input key is greater than or equal to the value of the previously stored key, consider the current input key as belonging to a set of keys qualifying for inclusion in the most recent output list. When the sort order is descending and the value of the current input key is less than or equal to the value of the previously stored key, consider the current input key as belonging to a set of keys qualifying for inclusion in the most recent output list. When the number of keys in the set of keys qualifying for inclusion in the most recent output list is zero, the next record to store will be the first record of an output list. When the number of keys in the set of keys qualifying for inclusion in the most recent output list is non-zero, the next record to store will be included in the most recent output list.

3. When the next record to store will be included in the most recent output list, compare the keys in the set of keys qualifying for inclusion in the most recent output list. When the sort order is ascending, select the smallest key value and corresponding record. When the sort order is descending, select the largest key value and corresponding record.

4. When the next record to store will be the first record of an output list, compare the keys of the records designated by the current input list addresses corresponding to input lists which are active, not empty, and not incomplete. When the sort order is ascending, select the smallest key value and corresponding record. When the sort order is descending, select the largest key value and corresponding record.

5. The selected record is placed at the current first operand location.

6. The current first operand address is incremented by the number of bytes equal to the length of the selected record.

7. The current input list address, corresponding to the input list containing the selected record, is incremented by the number of bytes equal to the length of the selected record.

As part of the operation when merge mode is zero, for each output list stored at the first operand location, a corresponding output list delineation (OLD) is stored at the second operand location. Each OLD includes, for instance, an 8-byte OLD address, which designates the location of the first record in the corresponding output list, and, for instance, an 8-byte OLD length, which specifies the length, in bytes, of the corresponding output list. When the operation ends with condition code 3, condition code 2 and EILF equal to one, or condition code 2 and IILF equal to one, the most recent output list being processed at the end of the operation may be partially processed and not completely processed. That is, the number of records in the partially processed output list is an intermediate value and may be increased when the operation resumes. In this case, an output list delineation (OLD), corresponding to the partially processed output list, is not placed at the second operand location, until after the operation is resumed and the output list is completely processed.

When merge mode is zero and the operation ends after storing one or more records and normal completion does not occur, the key of the last record stored to the first operand location is also stored to the continuation record recall buffer.

When merge mode is zero and the operation ends due to normal completion, one or more output lists have been placed at the first operand location and output list delineations have been placed at the second operand location. The program may use output list delineations as input list address and length values in a parameter block for a subsequent SORTL operation.

FIGS. 6A-6D illustrate the first and second operands, before and after executing SORTL-SFLR with merge mode equal zero. Referring to FIGS. 6A-6B, FOSA 600 is first operand starting address: location specified by $R_1$; FOEA 602 is first operand ending address: location specified by $R_1+(R_1+1)-1$; and OL 604 is output list (e.g., output list 1 . . . output list N). Further, referring to FIGS. 6C-6D, SOSA 610 is second operand starting address: location specified by $R_2$; SOEA 612 is second operand ending address: location specified by $R_2+(R_2+1)-1$; and OLD 614 is output list designation (e.g., output list designation 1 . . . output list designation N).

When merge mode (MM) is one, the active input lists designate lists, each of which is treated as containing records, from left to right, in the sorted order, as specified by the SO field of the parameter block. When MM is one, the records stored to the first operand location constitute a single output list. When MM is one, each unit of operation includes, for instance, the following steps, in the order specified, as an example:

1. Compare the keys of the records designated by the current input list addresses corresponding to input lists which are active, not empty, and not incomplete. When the sort order is ascending, select the smallest key value and corresponding record. When the sort order is descending, select the largest key value and corresponding record.

2. The selected record is placed at the current first operand location.

3. The current first operand address is incremented by the number of bytes equal to the length of the selected record.
4. The current input list address, corresponding to the input list containing the selected record, is incremented by the number of bytes equal to the length of the selected record.

FIGS. 7A-7B illustrate the first operand, before and after executing SORTL-SFLR with merge mode equals one. Referring to FIGS. 7A-7B, FOSA 700 is first operand starting address: location specified by $R_1$; FOEA 702 is first operand ending address: location specified by $R_1+(R_1+1)-1$; and OL 704 is output list (e.g., output list 1).

As part of the operation when merge mode is zero or one, the input list addresses and lengths for the input lists in the active state are updated. For each input list in the active state, the input list address is incremented by the number of bytes of the records from the input list which were selected and placed at the first operand location during the operation, and the input list length is decremented by the same number. The formation and updating of the input list addresses are dependent on the addressing mode.

As the operation proceeds, an incomplete input list may be encountered. An incomplete input list is recognized during a unit of operation which attempts to reference a record from an input list which is incomplete. Multiple units of operation may be completed prior to recognizing an incomplete input list. This applies when merge mode is zero or one.

As the operation proceeds, an access exception for an access to an input list, the first operand, or the second operand, when applicable, may be encountered. An access exception is recognized during a unit of operation which attempts to access a storage location and an access exception exists for that location. Multiple units of operation may be completed prior to recognizing an access exception. This applies when merge mode is zero or one.

When the operation ends with partial completion, internal state data, which may include a history of prior comparisons between records, is stored to the continuation state buffer (CSB) field of the parameter block. Subsequently, when the instruction is re-executed, for the purpose of resuming the operation, the contents of the CSB may be loaded into the implementation and the history may be referenced when the operation resumes. This applies when merge mode is zero or one.

Normal completion occurs when the records from the active input lists have been sorted and stored to the first operand.

When the operation ends due to normal completion, the following occurs, in one embodiment:
  The address and length in general registers $R_1$ and $R_1+1$, respectively, are updated.
  The address and length in general registers $R_2$ and $R_2+1$, respectively, are updated when MM is zero.
  The input listN address and input listN length fields are updated for the input lists in the active state.
  The model version number is set.
  The continuation flag is set to zero.
  The empty input list flag is set to zero.
  The empty input list number is set to zero.
  The incomplete input list flag is set to zero.
  The incomplete input list number is set to zero.
  Condition code 0 is set.
  The formation and updating of the addresses and lengths are dependent on the addressing mode.

When normal completion occurs, the CSB field of the parameter block is undefined after the operation ends.

When a CPU-determined number of bytes have been processed, the operation ends and the following occurs, in one embodiment:
  The address and length in general registers $R_1$ and $R_1+1$, respectively, are updated.
  The address and length in general registers $R_2$ and $R_2+1$, respectively, are updated when MM is zero.
  The input listN address and input listN length fields are updated for the input lists in the active state.
  The model version number is set.
  The continuation flag is set to one.
  A key value is stored to the continuation record recall buffer when MM is zero and one or more records have been placed at the first operand location during the execution of the instruction.
  The continuation state buffer is updated.
  The empty input list flag is set to zero.
  The empty input list number is set to zero.
  The incomplete input list flag is set to zero.
  The incomplete input list number is set to zero.
  Condition code 3 is set.
  The formation and updating of the addresses and lengths are dependent on the addressing mode.

The CPU-determined number of bytes depends on the model, and may be a different number each time the instruction is executed. The CPU-determined number of bytes is typically non-zero. Although this number may be zero and appear as a no-progress case, the CPU protects against endless recurrence of this no-progress case.

Subsequent to the instruction ending with, e.g., condition code 3 set, it is expected the program does not modify any input or output specification for the instruction and branches back to re-execute the instruction to resume the operation.

When bit 0 of the empty input lists control (EILCL) is one and the length of input list0 becomes zero during the operation and normal completion does not apply, the operation ends and the following occurs, in one embodiment:
  The address and length in general registers $R_1$ and $R_1+1$, respectively, are updated.
  The address and length in general registers $R_2$ and $R_2+1$, respectively, are updated when MM is zero.
  The input listN address and input listN length fields are updated for the input lists in the active state.
  The model version number is set.
  The continuation flag is set to one.
  A key value may be stored to the continuation record recall buffer when EILCL is 10 binary and MM is zero. A key value is stored to the continuation record recall buffer when EILCL is 11 binary and MM is zero. In either case, one or more records have been placed at the first operand location during execution of the instruction.
  The continuation state buffer is updated.
  The empty input list flag is set (refer to FIG. 8, which depicts various parameter block fields when an operation ends).
  The empty input list number is set (refer to FIG. 8).
  The incomplete input list flag is set to zero.
  The incomplete input list number is set to zero.
  Condition code 2 is set.
  The formation and updating of the addresses and lengths are dependent on the addressing mode.

When bit 1 of the empty input lists control (EILCL) is one and the length of an active input list, other than input list0, becomes zero during the operation and normal completion does not apply, the operation ends and the following occurs, in one embodiment:

The address and length in general registers $R_1$ and $R_1+1$, respectively, are updated.
   The address and length in general registers $R_2$ and $R_2+1$, respectively, are updated when MM is zero.
   The input listN address and input listN length fields are updated for the input lists in the active state.
   The model version number is set.
   The continuation flag is set to one.
   A key value may be stored to the continuation record recall buffer when EILCL is 01 binary and MM is zero. A key value is stored to the continuation record recall buffer when EILCL is 11 binary and MM is zero. In either case, one or more records have been placed at the first operand location during the execution of the instruction.
   The continuation state buffer is updated.
   The empty input list flag is set (refer to FIG. 8).
   The empty input list number is set (refer to FIG. 8).
   The incomplete input list flag is set to zero.
   The incomplete input list number is set to zero.
   Condition code 2 is set.
   The formation and updating of the addresses and lengths are dependent on the addressing mode.

When an incomplete input list in the active state is encountered, the operation ends and the following occurs, in one embodiment:

The address and length in general registers $R_1$ and $R_1+1$, respectively, are updated.
   The address and length in general registers $R_2$ and $R_2+1$, respectively, are updated when MM is zero.
   The input listN address and input listN length fields are updated for the input lists in the active state.
   The model version number is set.
   The continuation flag is set to one.
   A key value is stored to the continuation record recall buffer when MM is zero and one or more records have been placed at the first operand location during the execution of the instruction.
   The continuation state buffer is updated.
   The empty input list flag is set to zero.
   The empty input list number is set to zero.
   The incomplete input list flag (IILF) is set to one.
   The input list number of the incomplete input list encountered is placed in the incomplete input list number (IILN) field of the parameter block.
   Condition code 2 is set.
   The formation and updating of the addresses and lengths are dependent on the addressing mode.

When the length of the first operand is insufficient to store another record, the operation ends and the following occurs, in one embodiment:

The address and length in general registers $R_1$ and $R_1+1$, respectively, are updated.
   The address and length in general registers $R_2$ and $R_2+1$, respectively, are updated when MM is zero.
   The input listN address and input listN length fields are updated for the input lists in the active state.
   The model version number is set.
   The continuation flag is set to one.
   A key value may be stored to the continuation record recall buffer when MM is zero and one or more records have been placed at the first operand location during execution of the instruction.
   The continuation state buffer is updated.
   The empty input list flag is set to zero.
   The empty input list number is set to zero.
   The incomplete input list flag is set to zero.
   The incomplete input list number is set to zero
   Condition code 1 is set.
   The formation and updating of the addresses and lengths are dependent on the addressing mode.

When merge mode (MM) is zero and the length of the second operand is less than 16, the operation ends and the following occurs, in one embodiment:

The address and length in general registers $R_1$ and $R_1+1$, respectively, are updated.
   The address and length in general registers $R_2$ and $R_2+1$, respectively, are updated.
   The input listN address and input listN length fields are updated for the input lists in the active state.
   The model version number is set.
   The continuation flag is set to one.
   A key value may be stored to the continuation record recall buffer when one or more records have been placed at the first operand location during the execution of the instruction.
   The continuation state buffer is updated.
   The empty input list flag is set to zero.
   The empty input list number is set to zero.
   The incomplete input list flag is set to zero.
   The incomplete input list number is set to zero.
   Condition code 1 is set.
   The formation and updating of the addresses and lengths are dependent on the addressing mode.

The operation ending condition is called partial completion when execution of the instruction ends in completion (does not end in suppression, nullification, or termination) and normal completion does not occur.

A PER storage alteration event is recognized, when applicable, for the first operand location, the second operand location, the continuation record recall buffer, and the portion of the parameter block that is stored. When a PER storage alteration event is recognized, fewer than 4K additional bytes are stored to the operand location intersecting with the designated PER storage area, before the event is reported.

A PER zero address detection event is recognized, when applicable, for the parameter block, first operand location, and second operand location. Zero address detection does not apply to the input list addresses and the continuation record recall buffer origin, which are specified in the parameter block.

Refer to Other Conditions below for descriptions of examples of other conditions that apply to the SORTL-SFLR function.

When the instruction ends with condition code 1, the program may modify the first operand address, first operand length, second operand address, second operand length, any active input list address, and any active input list length, as appropriate, and subsequently, resume the operation.

When the instruction ends with condition code 2, IILF equal zero, and EILF equal zero, the program may modify the first operand address, first operand length, second operand address, second operand length, any active input list address, and any active input list length, as appropriate, and subsequently, resume the operation.

When the instruction ends with condition code 2 and EILF equal one, the program may modify the input list address and length for the input list specified by the EILN, as appropriate, and subsequently, resume the operation. In this case, the program may also modify the first operand address and first operand length when merge mode (MM) is one.

When the instruction ends with condition code 2 and IILF equal one, the program may modify the input list address and length for the input list specified by the IILN, as appropriate, and subsequently, resume the operation. In this case, the program may also modify the first operand address and first operand length when merge mode (MM) is one.

When the instruction ends with condition code 3, and before re-executing the instruction to resume the operation, the program modifies any active input list address or length, the first operand address or length, or the second operand address or length, results are unpredictable.

Function Code 2: SORTL-SVLR (Sort Variable-Length Records)

Figure 9:
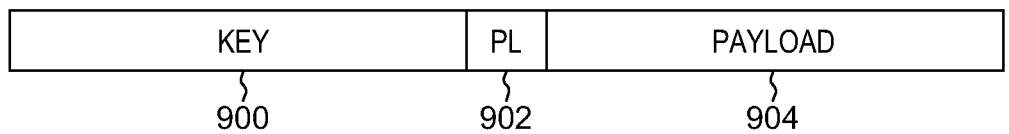
FIG. 9 depicts one example of a variable-length record format used by the Sort Lists instruction, in accordance with an aspect of the present invention.

The SORTL-SVLR function operates the same as the SORTL-SFLR function, except for the following:
  The records include, for instance, as shown in FIG. 9, a fixed-length key 900, an 8-byte payload length (PL) 902, and a variable-length payload 904. Therefore, the records have a variable length.
  Bytes 14-15 of the parameter block for the SORTL-SVLR function are ignored.
  The least significant, e.g., 2 bytes of the payload length field of each record contains an unsigned binary integer specifying the length, in bytes, of the payload in the same record. A payload length of zero is valid. The payload length is to be a multiple of, e.g., 8; otherwise a general operand data exception is recognized, in one example. The most significant 6 bytes (as an example) of the payload length field are reserved and should contain zeros; otherwise, the program may not operate compatibly in the future. The sum of the key length, eight, and the payload length is not to be larger than, e.g., 4096; otherwise a general operand data exception is recognized, in one example. When a general operand data exception is recognized as a result of an inappropriate payload length, the input list address corresponding to the active input list encountering the exception specifies the logical address of the leftmost byte of the errant record. When a variable length record is stored to the first operand location, the reserved bytes of the payload length field are not modified.
  An incomplete input list may not be recognized during a unit of operation which only attempts to reference the key of a record from an input list with an input list length greater than the key size and less than the record size. In this case, the incomplete input list will be recognized when attempting to store the record from the incomplete input list, to the first operand location.

The parameter block for the SORTL-SVLR function is the same as the parameter block for the SORTL-SFLR function, except for bytes 14-15, as indicated above.

Refer to Other Conditions below for descriptions of other conditions that apply to the SORTL-SVLR function.

Special Conditions

A specification exception is recognized when execution of Sort Lists is attempted and any of the following applies, in one embodiment:
  Bits 57-63 of general register 0 designate an unassigned or uninstalled function code.
  The $R_1$ field designates an odd-numbered register or general register 0.
  The $R_2$ field designates an odd-numbered register or general register 0. This applies when merge mode (MM) is zero or one.
  The parameter block is not designated on a doubleword boundary.
  The SORTL-SFLR function or the SORTL-SVLR function is specified and the first operand is not designated on a doubleword boundary.
  The SORTL-SFLR or SORTL-SVLR function is specified and the second operand is not designated on a doubleword boundary when MM is zero.

A general operand data exception is recognized when execution of Sort Lists is attempted and any of the following applies, in one embodiment:
  The SORTL-SFLR or SORT-SVLR function is specified and no bits, or multiple bits, of bits 0-7 of the parameter block version number, contain a value of one, in which case the operation is suppressed.
  The SORTL-SFLR or SORTL-SVLR function is specified and the size or format of the parameter block, as specified by the parameter block version number, is not supported by the model, in which case the operation is suppressed.
  The SORTL-SFLR or SORTL-SVLR function is specified and the record key length specifies a key size of zero, a key size which is not a multiple of 8, or a key size greater than 4096, in which case the operation is suppressed.
  The SORTL-SFLR function is specified and the record payload length specifies a payload size which is not a multiple of 8, or a payload size, when added to the key size, is greater than 4096, in which case the operation is suppressed.
  The SORTL-SVLR function is specified and the record payload length specifies a payload size which is not a multiple of 8, or a payload size, when added to the key size, is greater than 4088, in which case it is model dependent whether the operation is suppressed or terminated.
  The SORTL-SFLR or SORTL-SVLR function is specified and the value of the active input lists count code (AILCC) plus one is greater than the number of input lists described by the parameter block, in which case the operation is suppressed.
  The SORTL-SFLR or SORTL-SVLR function is specified and an input list address, corresponding to an active input list, is not designated on a doubleword boundary, in which case the operation is suppressed.

Other Conditions

In one embodiment, the following conditions apply:
  The execution of the instruction is interruptible. When an interruption occurs, the addresses in general registers $R_1$ and $R_2$, the lengths in general registers $R_1+1$ and $R_2+1$, and specific fields of the parameter block are updated, so that the instruction, when re-executed, resumes at the point of interruption.

Access exceptions are not recognized for locations greater than 4 K-bytes to the right of the location designated by the first operand address. Access exceptions are not recognized for locations greater than 4 K-bytes to the right of the location designated by an input list address.

If an access exception is due to be recognized for the first operand, second operand, or any input list, the result is that either the exception is recognized or condition code 3 is set. If condition code 3 is set, the exception will be recognized when the instruction is executed again to continue processing the same operands, assuming the exception condition still exists.

When the key of a record crosses a page boundary and access exception conditions exist for both pages, either access exception may be recognized.

When access exception conditions exist for multiple keys being processed during a single unit of operation, any of these conditions may be recognized.

When the parameter block crosses a page boundary and access exception conditions exist for both pages, the access exception for the leftmost page is recognized.

When the operation ends with partial completion, up to 4 K-bytes of data may have been stored at locations within the first operand which are at, or to the right of, the location designated by the updated first operand address. Such stores result in setting change bits, when applicable, and recognizing PER storage alteration events, when applicable. Storing to these locations will be repeated when the instruction is executed again to continue processing the same operands.

As observed by this CPU, other CPUs, and channel programs, references to the parameter block, the first operand, the output lists delineations buffer, and the input lists in the active state may be multiple access references, accesses to these storage locations are not necessarily block concurrent, and the sequence of these accesses or references is undefined.

Results are unpredictable when the specified function is SORTL-SFLR or SORTL-SVLR and any of the following apply, in one embodiment:

The parameter block overlaps any active input list or the first operand.
Any active input list overlaps the first operand.
Merge mode is zero and the parameter block overlaps the second operand or the continuation record recall buffer.
Merge mode is zero and any active input list overlaps the second operand or the continuation record recall buffer.
Merge mode is zero and the first operand overlaps the second operand or the continuation record recall buffer.
Merge mode is zero and the second operand overlaps the continuation record recall buffer.
Another CPU or channel program stores to a key of a record in an input list or the continuation record recall buffer.

Example Resulting Condition Codes:
0 Normal completion
1 The length of the first operand is less than the size of a record, or merge mode is zero and the length of the second operand is less than 16 (i.e., the first or second operand length is insufficient to continue)
2 An incomplete input list was encountered (IILF=1), or the EILCL is non-zero and the length of an input list became equal to zero during the operation (i.e., incomplete or empty input list encountered)
3 CPU-determined amount of data processed (i.e., CPU-determined completion)

Program Exceptions:
Access (fetch, input lists; fetch and store, parameter block and continuation record recall buffer; store, operands 1 and 2)
Data with DXC (Data Exception Code) 0, general operand
Operation (if the enhanced-sort facility is not installed)
Specification
Transaction constraint An example of the priority of execution for the Sort Lists instruction is shown below. When multiple conditions which have priority values beginning with 13 exist, the condition recognized is the one that is encountered first, as the operation proceeds. When the operation is being resumed (the continuation flag is one at the beginning of the execution of the instruction), a history of prior comparisons between keys may be used in place of initially accessing the input lists which are active and not empty. As a result, an access exception for an access to a specific input list may not be encountered at the same point of processing, as compared to when no history of prior comparisons is used. When variable-length records are processed, conditions which are a function of a record length may be partially evaluated before the payload length is determined, and completely evaluated after the payload length is determined. As a result, the observed priority among such conditions may differ when a condition is determined to exist after only partially evaluating requirements, instead of after completely evaluating all requirements.

Example Priority of Execution (SORTL)
1.-6. Exceptions with the same priority as the priority of program interruption conditions for the general case.
7.A Access exceptions for second instruction halfword.
7.B Operation exception.
7.C Transaction constraint.
8.A Specification exception due to invalid function code or invalid register number.
8.B Specification exception due to first operand not designated on doubleword boundary.
8.C Specification exception due to first operand not designated on doubleword boundary.
8.D Specification exception due to second operand not designated on doubleword boundary and merge mode is zero.
9. Access exceptions for an access to bytes 0-7 of the parameter block.
10. General operand data exception due to an unsupported value of the PBVN field in the parameter block.
11. Access exceptions for an access to bytes of the parameter block other than bytes 0-7.
12. General operand data exception due to an invalid value of a field in the parameter block other than the PBVN.
13.A Access exceptions for an access to an active input list.
13.B Access exceptions for an access to the continuation record recall buffer when merge mode is zero.
13.C Access exceptions for an access to the first operand.
13.D Access exceptions for an access to the second operand when merge mode is zero.
13.E Condition code 2 due to an incomplete input list.
13.F Condition code 1 due to insufficient length of first operand.
13.G Condition code 1 due to insufficient length of second operand when merge mode is zero.
13.H General operand data exception due to an invalid payload length of a variable-length record.
13.I Condition code 2 due to an empty input list.
14. Condition code 3.

Programming Notes. In one embodiment:
1. The intended uses of the empty input lists control (EILCL) are as follows: EILCL(0:1)
   (Binary) Description
   00 Stop after the records from the active input lists are sorted (e.g., all records from all active input lists).
   10 Stop after input list0 (always active) becomes empty.
   11 Stop after any active input list becomes empty.

2. When the active input lists count code (AILCC) is zero, there is, e.g., only one active input list and the results stored at the first operand location are the same as the data fetched from input list0.
3. Models implementing separate instruction and data caches may use the instruction cache to perform storage operand fetch references to data in active input lists.
4. When a program expects to invoke Sort Lists multiple times with merge mode equal to zero, as part of processing a large data set, the program is to utilize, in one example, the input lists available and evenly partition records among the input lists. This reduces the number of times the data is accessed when sorting the entire data set.
5. Subsequent to Sort Lists with merge mode equal to zero ending with condition code 0 set and multiple output list delineations (OLDs) in the second operand, a program intending to generate a single list of records in sorted order is to invoke another Sort Lists operation with input lists specified to be the resulting OLDs from the prior Sort Lists invocation. In this case, in one example, the second invocation of Sort Lists specifies merge mode equal to one.

Similarly, in one embodiment subsequent to invoking Sort Lists with merge mode equal zero, for as many times as necessary or desired, to generate a complete set of sorted lists from a large number of randomly ordered records, Sort Lists is invoked, in one example, with merge mode equal one, for as many times as necessary or desired, to generate a single sorted list.
6. To reduce the number of times each record is accessed when merging multiple sorted lists into a single list with ascending sort order (for example), the program performs the following process, in one embodiment:

Determine the maximum number, N, of input lists available for Sort Lists.

Compare the keys of the first record of the sorted lists which have not yet been merged into the single list. Select the N lists which have the lowest first key values.

Execute Sort Lists with merge mode (MM) equal one, empty input lists control (EILCL) equal 10 binary, input list0 specifying only the first record of the list with the highest first key value of the selected N lists, and the remaining input lists specifying the other N−1 selected lists.

Subsequent to Sort Lists ending with condition code 2, IILF equal zero, and EILF equal zero, repeat the process.
7. Subsequent to Sort Lists ending with condition code 1 set, the program performs the following actions, in one example, prior to invoking Sort Lists again, to resume the operation:

If the first operand length is less than the largest record length of the records being processed, then the first operand length or first operand address and length should be updated, as appropriate.

If merge mode (MM) is zero and the second operand length is less than 16, then the second operand length or second operand address and length should be updated, as appropriate.

If the length of any active input list equals zero, then the corresponding input list address and length may be updated to designate another list of records to be included in the sorting operation.

8. Subsequent to Sort Lists ending with condition code 2 set, the program performs the following actions, in one example, prior to invoking Sort Lists again, to resume the operation:

If the incomplete input list flag (IILF) is one, then the input list length or input list address and length of the input list identified by the incomplete input list number (IILN) should be updated, as appropriate.

If the empty input list flag (EILF) is one, then the input list length or input list address and length of the input list identified by the empty input list number (EILN) should be updated, as appropriate.

If the IILF is zero, the EILF is zero, and the input list0 length is zero, then the input list0 length or input list0 address and length should be updated, as appropriate. Furthermore, the input list address and length for the active input lists may be updated, which may be the appropriate action if there was only one record designated by input list0 originally, and the empty input lists control (EILCL) is 10 binary.

If merge mode (MM) is one and the first operand length is less than the largest record length of the records being processed, then the first operand length or first operand address and length should be updated, as appropriate.

If MM is zero and either IILF is one, or EILF is one, then the first operand address and length, and the second operand address and length should not be updated.

If MM is zero, IILF is zero, EILF is zero, and the first operand length is less than the largest record length of the records being processed, then the first operand length or first operand address and length should be updated, as appropriate.

If MM is zero, IILF is zero, EILF is zero, and the second operand length is less than 16, then the second operand length or second operand address and length should be updated, as appropriate.

As described herein, in one aspect, a single instruction (e.g., a single architected machine instruction, Sort Lists) is provided to perform sort and/or merge operations on a general-purpose processor. In one example, a program implementing sorting and/or merging operations for a database and being executed on a general-purpose processor, is able to replace a significant subset of primitive instructions to implement the operations with a single instruction. This instruction is, for instance, a hardware instruction defined in an Instruction Set Architecture (ISA). As a result, the complexity of the program related to the sort and/or merge operations is reduced. Further, performance of the operations, and thus, the processor, is improved.

Advantageously, the Sort Lists instruction is executed on a general-purpose processor (e.g., a central processing unit, referred to herein as a processor), rather than a special-purpose processor, such as a graphical processing unit (GPU), a database engine (DBE), or other types of special-purpose processors.

Although various fields and registers are described, one or more aspects of the present invention may use other, additional or fewer fields or registers, or other sizes of fields and registers, etc. Many variations are possible. For instance, implied registers may be used instead of explicitly specified registers or fields of the instruction and/or explicitly specified registers or fields may be used instead of implied registers or fields. Other variations are also possible.

In one example, the Sort Lists instruction works on a large amount of data of a database (e.g., a commercial database), such as megabytes or terabytes of data. Therefore, the instruction is interruptible and processing may resume where interrupted.

Figure 10A:
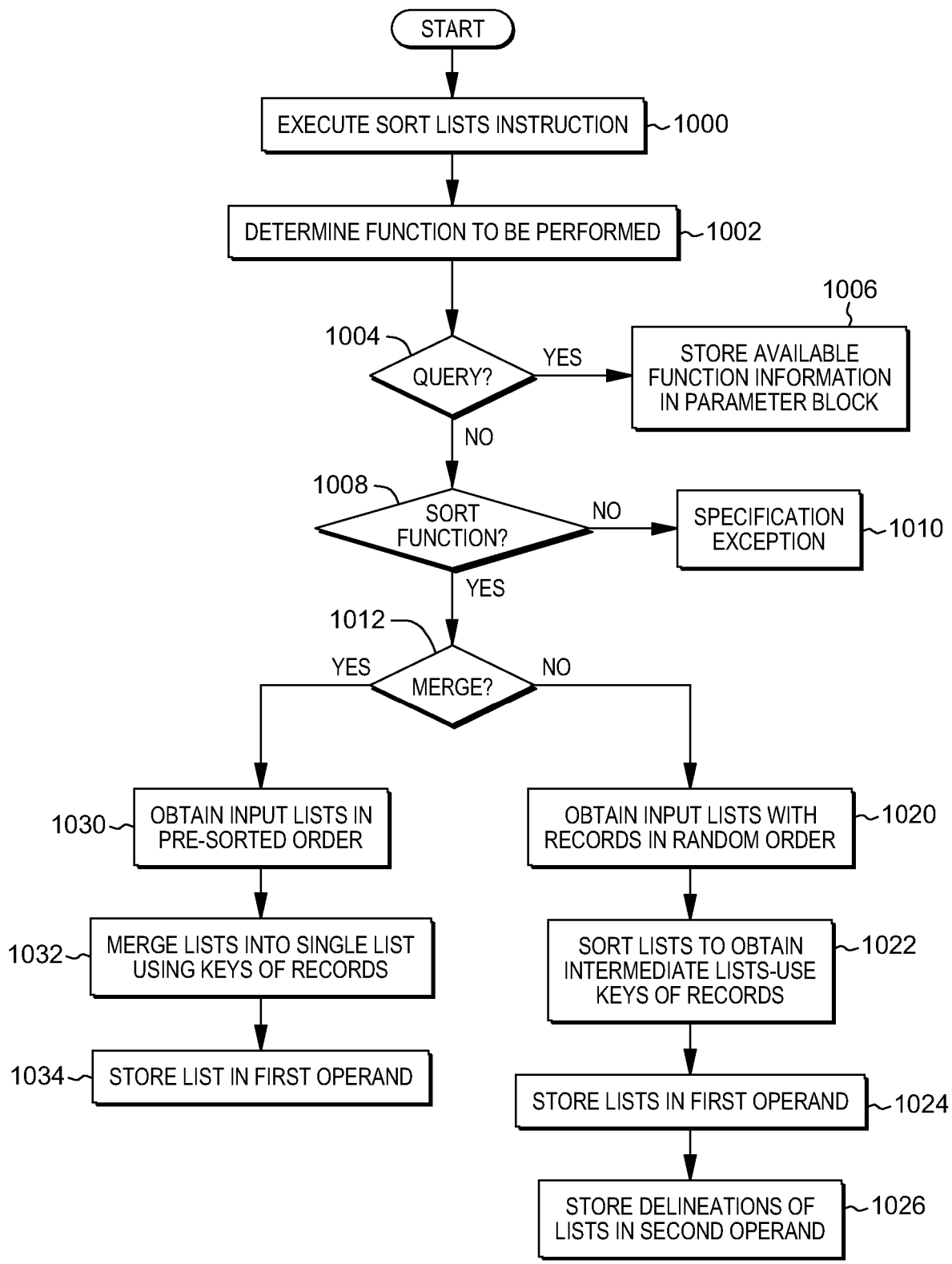
FIGS. 10A-10B depict one example of processing associated with the Sort Lists instruction, in accordance with an aspect of the present invention.

Further details of one embodiment of processing associated with the Sort Lists instruction are described with reference to FIG. 10A-10B. In one example, this processing is performed by a processor, such as processor 102 or 204.

In one example, the Sort Lists instruction is obtained and execution begins, STEP 1000. As indicated above, a plurality of functions may be specified for the Sort Lists instruction, and therefore, a determination is made as to the function to be performed, STEP 1002. If the function is a query function (e.g., function code 0 is specified in general register 0), INQUIRY 1004, then the available functions are provided, STEP 1006. For instance, installed functions vector 342, installed interface sizes vector 344 and installed parameter block formats vector 346 are stored in the parameter block.

However, if the query function is not requested, INQUIRY 1004, then a determination is made as to whether a sort function, such as sort fixed-length records or sort variable-length records, is being requested, INQUIRY 1008. If a query or sort function is not specified, then in one example, processing ends with, for instance, a specification exception, STEP 1010. If, however, a sort function is specified, then a further determination is made as to whether merging is requested (e.g., is merge mode 310 set to one), INQUIRY 1012.

If merging is not being requested, then sorting is performed on a plurality of input lists obtained using the parameter block specified by general register 1 (e.g., input list address fields 392, 394, 396 of the parameter block), STEP 1020. In one embodiment, a plurality of records are partitioned (e.g., evenly) by the program issuing the Sort Lists instruction into the plurality of input lists. The plurality of input lists are sorted using the keys of the records, STEP 1022. The sorting may be ascending or descending, as indicated in sort order field 366 of the parameter block.

The sorting produces intermediate output lists, each of which is in sorted order. These output lists are stored in the first operand, STEP 1024, and a delineation of each list is stored in the second operand, STEP 1026.

If a single list of sorted records is desired, then the Sort Lists instruction is re-executed, in one embodiment, specifying the merge option.

Returning to INQUIRY 1012, if merging is specified, then the input is a plurality of lists in pre-sorted order, which in one example, are specified using the parameter block, STEP 1030. These lists are merged into a single list using the keys of the records in the lists, STEP 1032. The merged list is stored in the first operand, STEP 1034.

Figure 10B:
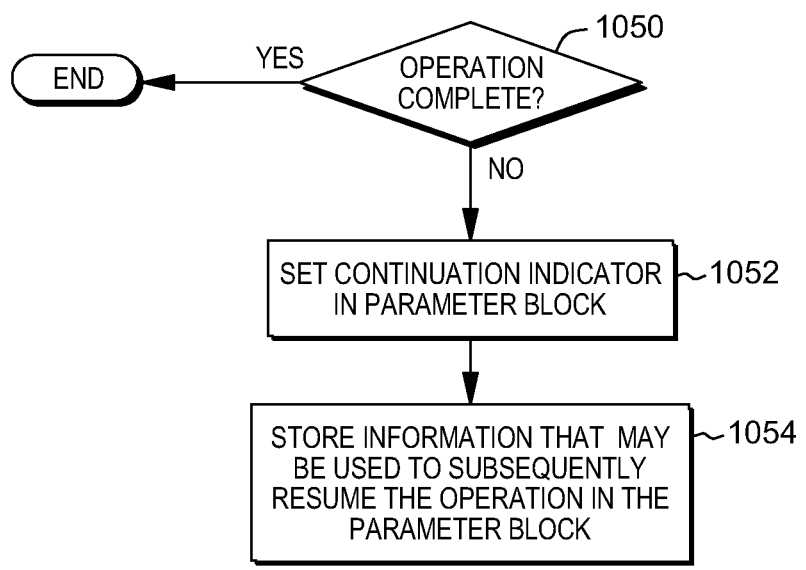

In one embodiment, with reference to FIG. 10B, the sort or merge operation may be interrupted, and therefore, in one example, if the operation is interrupted, INQUIRY 1050, then a continuation indicator (e.g., continuation flag 368 of the parameter block) is set, e.g., to one, STEP 1052. Further, information that may be used to subsequently resume the operation is stored, e.g., in the parameter block, STEP 1054. For instance, metadata, such as information relating to previously performed comparisons are stored in continuation state buffer 390, such that those comparisons do not have to be repeated. Additional or other information may also be stored, and/or other indicators may be set. Many variations are possible.

One or more aspects of the present invention are inextricably tied to computer technology and facilitate processing within a computer, improving performance thereof. The use of a single architected machine instruction to perform sorting and/or merging of a large number of database records of a database replaces many software instructions, improving performance within the computing environment. These sorted and/or merged records may be used in many technical fields that manage and/or use large quantities of data, such as in computer processing, medical processing, security, etc. By providing optimizations in sorting/merging, these technical fields are improved by reducing execution time in obtaining information and using the information, and reducing storage requirements.

Further details of one embodiment of facilitating processing within a computing environment, as it relates to one or more aspects of the present invention, are described with reference to FIGS. 11A-11B.

Referring to FIG. 11A, an instruction to perform a sort operation is obtained (1100). The instruction is a single architected machine instruction of an instruction set architecture (1102), and is executed, by a general-purpose processor of the computing environment (1104). The executing includes, for instance, sorting a plurality of input lists to obtain one or more sorted output lists (1106), and providing as output the one or more sorted output lists (1108).

In one embodiment, the instruction includes an operation code field including an operation code to specify a sort list operation, and one field to be used to designate one location, the one location to be used in storing the one or more sorted output lists (1110). In a further embodiment, the instruction includes another field to be used to designate another location, the other location to store one or more output list delineations (1112). As examples, the one field is a register field, the register field designating a register, the register including an address of the one location, and the other field is another register field, the other register field designating another register, the other register including an address of the other location (1114).

In one example, referring to FIG. 11B, the instruction employs one implied register to determine a function to be performed by the instruction (1120). As an example, the function is selected from a group of functions consisting of: a query available functions function, a sort fixed-length records function, and a sort variable-length records function (1122).

As a further example, the instruction employs another implied register to locate a parameter block in memory used by the instruction (1123). The parameter block includes information used by the instruction depending on the function to be performed (1124). In one particular example, the function to be performed is a sort fixed-length records function or a sort variable-length records function, and the parameter block includes information to locate the plurality of input lists and information to continue the sorting, based on the sorting being interrupted (1126).

In one embodiment, the one implied register further includes a mode of operation indicator, the mode of operation indicator to be used to specify whether a merge of the one or more sorted output lists is to be performed (1128).

As a particular example, the instruction includes an operation code field including an operation code to specify a sort list operation; a first register field including a designation of a first register, the first register including an address used in storing the one or more sorted output lists; and a second register field including a designation of a second register, the second register including an address used in storing one or more output list delineations, and wherein the instruction employs a first implied register to determine a function to be performed by the instruction and a second implied register to locate a parameter block in memory used by the instruction (1130).

Other variations and embodiments are possible.

Figure 12A:
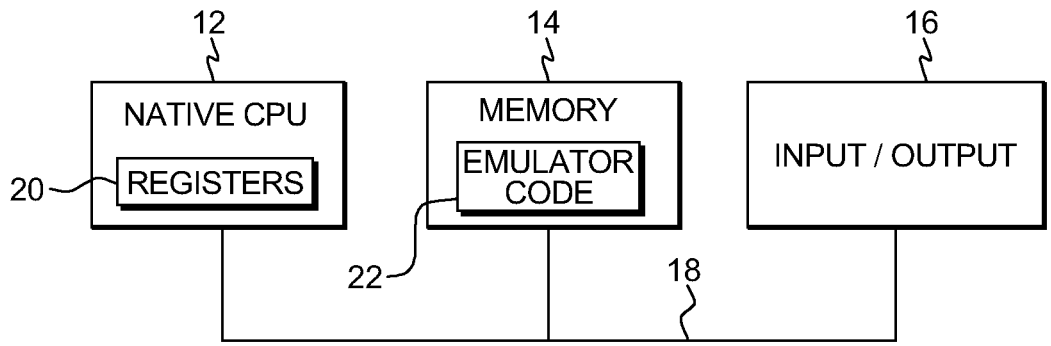
FIG. 12A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 12A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 12B:
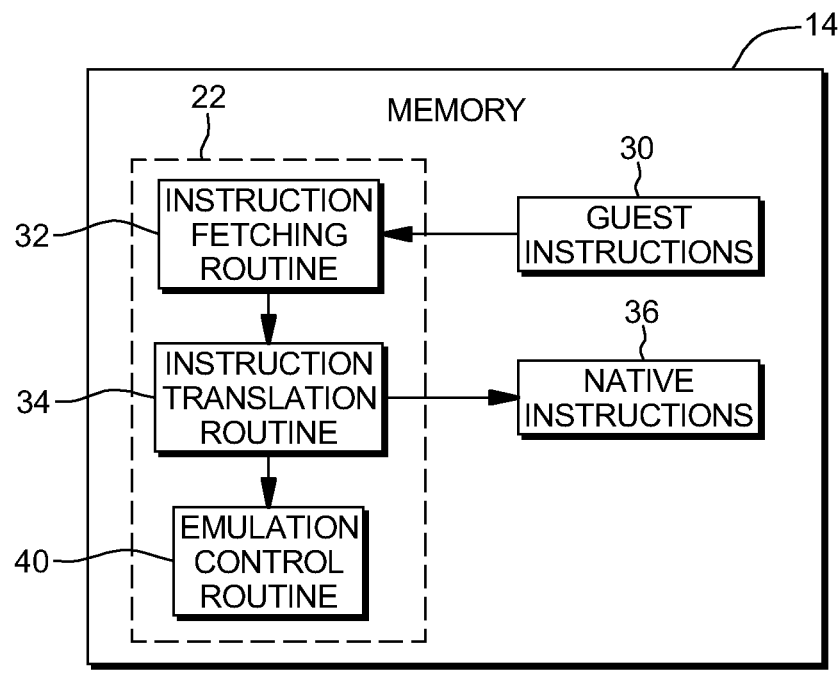
FIG. 12B depicts further details of the memory of FIG. 12A.

Further details relating to emulator code 22 are described with reference to FIG. 12B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to provide sorting and/or merging, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
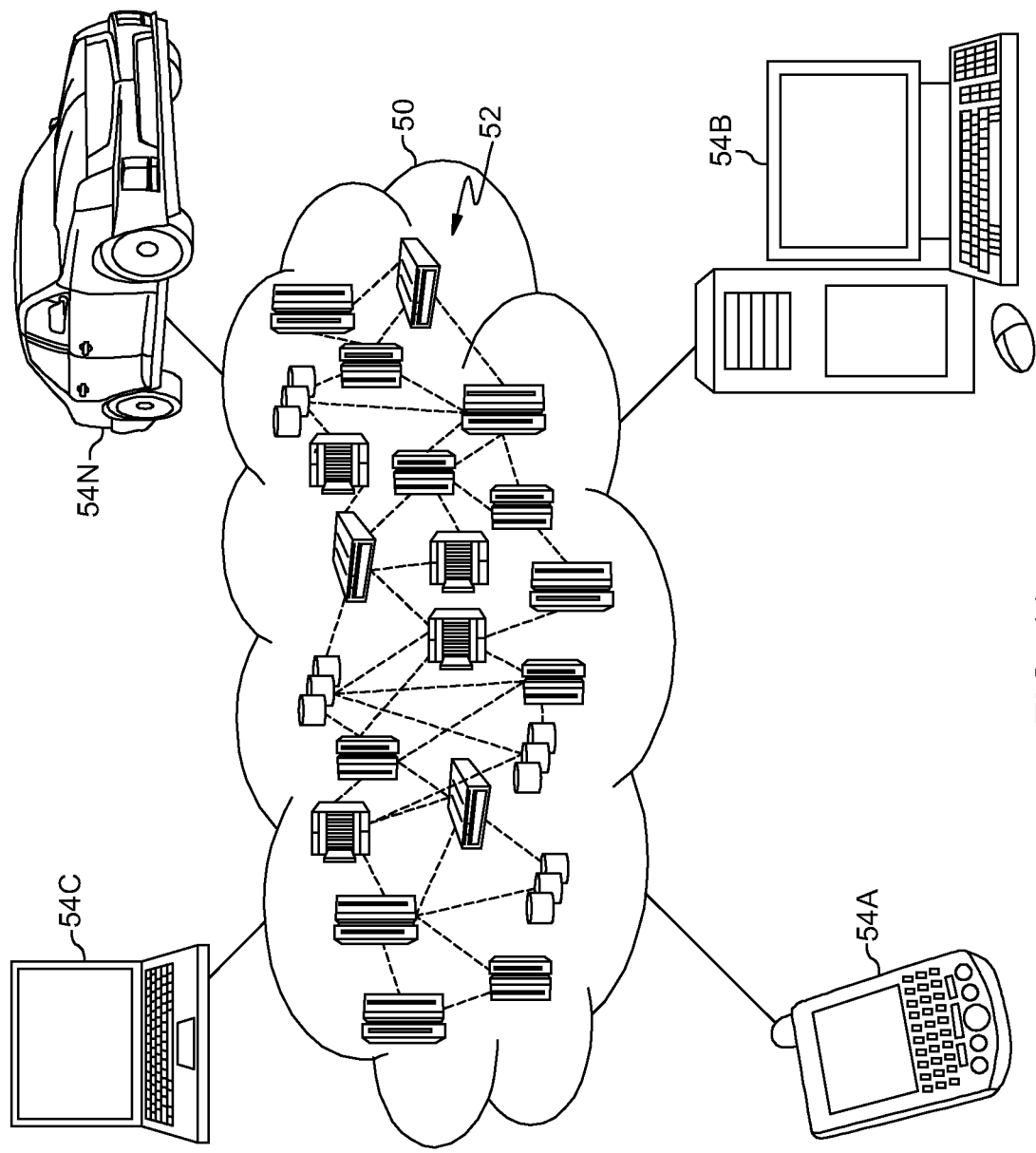
FIG. 13 depicts one embodiment of a cloud computing environment.

Referring now to FIG. 13, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 52 and cloud computing environment 50 can communicate with any type of computerized device over any type of network and/or network addressable connection (e.g., using a web browser).

Figure 14:
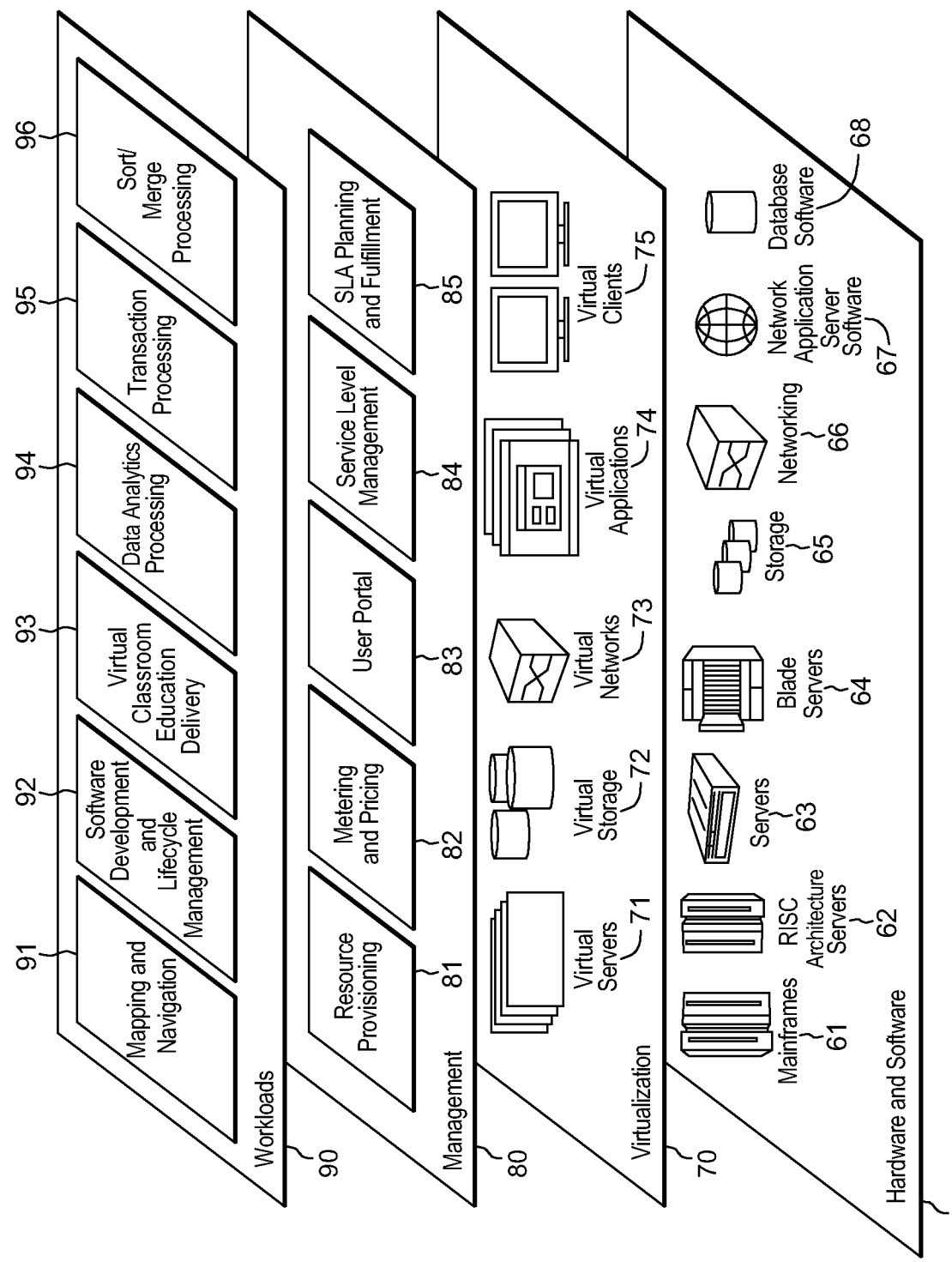
FIG. 14 depicts one example of abstraction model layers.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sort and/or merge processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of indications (other than register numbers) may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      obtaining an instruction to perform a sort operation, the instruction being a single architected machine instruction of an instruction set architecture, and the instruction to access one field to be used to designate a location, the location to be used to store one or more output list delineations; and
      executing, by a general-purpose processor of the computing environment, the instruction, the executing comprising:
         sorting a plurality of input lists to obtain one or more sorted output lists; and
         providing as output the one or more sorted output lists and providing the one or more output list delineations, the one or more output list delineations being based on the one or more sorted output lists, wherein an output list delineation of the one or more output list delineations corresponds to a sorted output list of the one or more sorted output lists and includes information relating to the sorted output list, the information including a length of the sorted output list.

2. The computer program product of claim 1, wherein the instruction includes an operation code field including an operation code to specify a sort list operation, and has access to another field to be used to designate another location, the another location to be used in storing the one or more sorted output lists.

3. The computer program product of claim 2, wherein the one field is a register field, the register field designating a register, the register including an address of the location, and the another field is another register field, the another register field designating another register, the another register including an address of the another location.

4. The computer program product of claim 1, wherein the instruction employs one select register to determine a function to be performed by the instruction.

5. The computer program product of claim 4, wherein the function is selected from a group of functions consisting of: a query available functions function, a sort fixed-length records function, and a sort variable-length records function.

6. The computer program product of claim 4, wherein the instruction employs another select register to locate a parameter block in memory used by the instruction, the parameter block including information used by the instruction depending on the function to be performed.

7. The computer program product of claim 6, wherein the function to be performed is a sort fixed-length records function or a sort variable-length records function, and the parameter block includes information to locate the plurality of input lists and information to continue the sorting, based on the sorting being interrupted.

8. The computer program product of claim 6, wherein the one select register further comprises a mode of operation indicator, the mode of operation indicator to be used to specify whether a merge of the one or more sorted output lists is to be performed.

9. The computer program product of claim 6, wherein the one select register is one implied register and the other select register is another implied register.

10. The computer program product of claim 1, wherein the instruction includes an operation code field including an operation code to specify a sort list operation; one register field including a designation of one register, the one register including an address used in storing the one or more output list delineations; and another register field including a designation of another register, the another register including an address used in storing the one or more sorted output lists, and wherein the instruction employs a first implied register to determine a function to be performed by the instruction and a second implied register to locate a parameter block in memory used by the instruction.

11. A computer system for facilitating processing within a computing environment, the computer system comprising:
   a memory; and
   a processor in communication with the memory, wherein the computer system is configured to perform a method, said method comprising:
      obtaining an instruction to perform a sort operation, the instruction being a single architected machine instruction of an instruction set architecture, and the instruction to access one field to be used to designate a location, the location to be used to store one or more output list delineations; and
      executing, by a general-purpose processor of the computing environment, the instruction, the executing comprising:
         sorting a plurality of input lists to obtain one or more sorted output lists; and
         providing as output the one or more sorted output lists and providing the one or more output list delineations, the one or more output list delineations being based on the one or more sorted output lists, wherein an output list delineation of the one or more output list delineations corresponds to a sorted output list of the one or more sorted output lists and includes information relating to the sorted output list, the information including a length of the sorted output list.

12. The computer system of claim 11, wherein the instruction includes an operation code field including an operation code to specify a sort list operation, and has access to another field to be used to designate another location, the another location to be used in storing the one or more sorted output lists.

13. The computer system of claim 11, wherein the instruction employs one select register to determine a function to be performed by the instruction.

14. The computer system of claim 13, wherein the function is selected from a group of functions consisting of: a query available functions function, a sort fixed-length records function, and a sort variable-length records function.

15. The computer system of claim 11, wherein the instruction includes an operation code field including an operation code to specify a sort list operation; one register field including a designation of one register, the one register including an address used in storing the one or more output list delineations; and another register field including a designation of another register, the another register including an address used in storing the one or more sorted output lists, and wherein the instruction employs a first implied register to determine a function to be performed by the instruction and a second implied register to locate a parameter block in memory used by the instruction.

16. A computer-implemented method facilitating processing within a computing environment, the computer-implemented method comprising:
   obtaining an instruction to perform a sort operation, the instruction being a single architected machine instruction of an instruction set architecture, and the instruction to access one field to be used to designate a location, the location to be used to store one or more output list delineations; and
   executing, by a general-purpose processor of the computing environment, the instruction, the executing comprising:
      sorting a plurality of input lists to obtain one or more sorted output lists; and
      providing as output the one or more sorted output lists and providing the one or more output list delineations, the one or more output list delineations being based on the one or more sorted output lists, wherein an output list delineation of the one or more output list delineations corresponds to a sorted output list of the one or more sorted output lists and includes information relating to the sorted output list, the information including a length of the sorted output list.

17. The computer-implemented method of claim 16, wherein the instruction includes an operation code field including an operation code to specify a sort list operation, and has access to another field to be used to designate another location, the another location to be used in storing the one or more sorted output lists.

18. The computer-implemented method of claim 16, wherein the instruction employs one select register to determine a function to be performed by the instruction.

19. The computer-implemented method of claim 18, wherein the function is selected from a group of functions consisting of: a query available functions function, a sort fixed-length records function, and a sort variable-length records function.

20. The computer-implemented method of claim 16, wherein the instruction includes an operation code field including an operation code to specify a sort list operation; one register field including a designation of one register, the one register including an address used in storing the one or more output list delineations; and another register field including a designation of another register, the another register including an address used in storing the one or more sorted output lists, and wherein the instruction employs a first implied register to determine a function to be performed by the instruction and a second implied register to locate a parameter block in memory used by the instruction.

* * * * *